US008739168B2

(12) United States Patent  
Mizuno

(10) Patent No.: US 8,739,168 B2  
(45) Date of Patent: May 27, 2014

(54) INFORMATION PROCESSING APPARATUS CAPABLE OF SETTING PROCESSING PRIORITY OF ACCESS, METHOD OF CONTROLLING THE INFORMATION PROCESSING APPARATUS, PROGRAM, AND STORAGE MEDIUM

(75) Inventor: Takafumi Mizuno, Higashimurayama (JP)

(73) Assignee: Canon Kabushiki Kaisha (JP)

( * ) Notice: Subject to any disclaimer, the term of this patent is extended or adjusted under 35 U.S.C. 154(b) by 250 days.

(21) Appl. No.: 13/393,398

(22) PCT Filed: Dec. 20, 2010

(86) PCT No.: PCT/JP2010/073648  
§ 371 (c)(1),  
(2), (4) Date: Feb. 29, 2012

(87) PCT Pub. No.: WO2011/078386  
PCT Pub. Date: Jun. 30, 2011

(65) Prior Publication Data  
US 2012/0167110 A1    Jun. 28, 2012

(30) Foreign Application Priority Data  
Dec. 22, 2009    (JP) .................................. 2009-290966

(51) Int. Cl.  
*G06F 9/46* (2006.01)

(52) U.S. Cl.  
USPC ........................................................ 718/103

(58) Field of Classification Search  
None  
See application file for complete search history.

(56) References Cited

U.S. PATENT DOCUMENTS

| 5,937,205 A * | 8/1999 | Mattson et al. .................... 710/6 |
| 2004/0006604 A1 * | 1/2004 | Kawashima et al. ......... 709/213 |
| 2006/0259591 A1 * | 11/2006 | Hashimoto .................... 709/219 |
| 2008/0189152 A1 * | 8/2008 | Hara et al. ........................ 705/7 |

FOREIGN PATENT DOCUMENTS

| JP | 06-309179 A | 11/1994 |
| JP | 10-254721 A | 9/1998 |
| JP | 2000-089971 A | 3/2000 |
| JP | 2005-122702 A | 5/2005 |
| JP | 2009-193107 A | 8/2009 |

OTHER PUBLICATIONS

International Search Report issued in PCT/JP2010/073648 dated Jan. 25, 2011.

* cited by examiner

*Primary Examiner* — Emerson Puente  
*Assistant Examiner* — Adam Lee  
(74) *Attorney, Agent, or Firm* — Rossi, Kimms & McDowell LLP

(57) ABSTRACT

An information processing apparatus that gives priority to an access made by a usual manual operation for execution of original functions of the apparatus, even when automatically programmed access for index creation from an external apparatus to the storage and the access for execution of original functions occur concurrently. A CPU causes a priority to be set to each processing requested by an request. The CPU executes the processing based on the set priority, and causes a processing result to a requesting source. If the received request is a specific request, the CPU causes calculation of a number of times that a time period elapsed after returning of the response until receipt of a next processing is within a predetermined time period. The CPU determines whether or not to change the priority based on the calculated number of times.

13 Claims, 22 Drawing Sheets

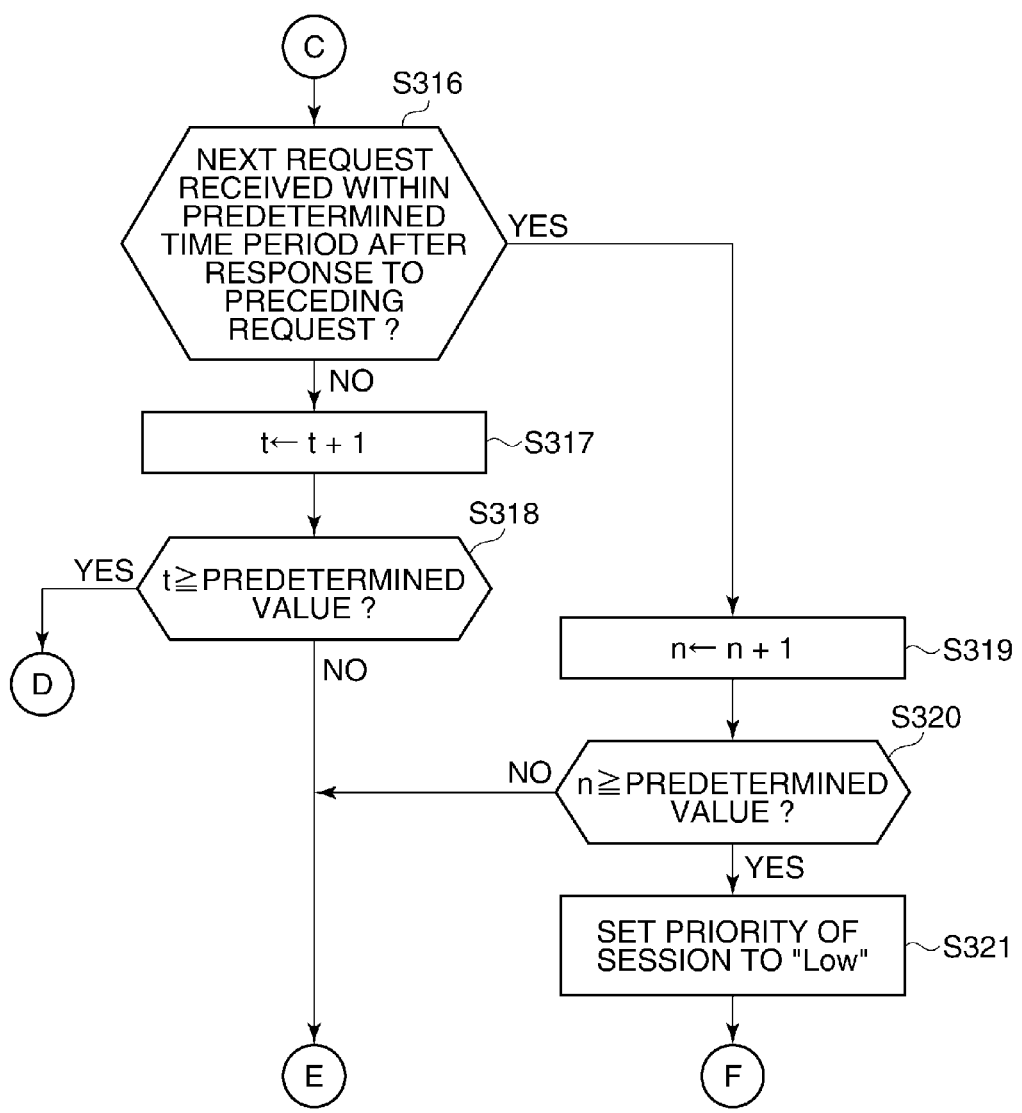

FIG.5

| REQUEST TYPE | API |
|---|---|
| LOGIN | Login |
| LOGOUT | Logout |
| FILE CREATION | FileCreate |
| FILE DELETION | FileDelete |
| FILE OPENING | FileOpen |
| FILE CLOSING | FileClose |
| FILE READING | FileRead |
| FILE WRITING | FileWrite |
| FILE SEEKING | FileSeek |
| FOLDER CREATION | DirectoryCreate |
| FOLDER DELETION | DirectoryDelete |
| FOLDER OPENING | DirectoryOpen |
| FOLDER CLOSING | DirectoryClose |
| FOLDER READING | DirectoryRead |
| FOLDER CHANGING | ChangeDirectory |
| AUTHORITY CHANGING | ChangeMode |
| OWNER CHANGING | ChangeOwner |
| ATTRIBUTE ACQUISITION | GetAttribute |
| ATTRIBUTE SETTING | SetAttribute |
| NAME CHANGING | Rename |
| COPY | Copy |

*FIG.6*

| SESSION ID | USER NAME | PRIORITY | t | n | RESPONSE TIME |
|---|---|---|---|---|---|
| 1 | tanaka | Middle | 6 | 0 | 1246872464.90335200 |
| 5 | yamada | High | 10 | 1 | |
| 8 | suzuki | Low | 2 | 10 | |

FIG.7

| SESSION ID | USER NAME | PRIORITY | t | n | RESPONSE TIME | PRECEDING REQUEST |
|---|---|---|---|---|---|---|
| 1 | tanaka | Middle | 6 | 0 | 1246872464.90335200 | GetList(/share/folder) |
| 5 | yamada | High | 10 | 1 | | WriteData(/user/yamada/abc/foo.txt) |
| 8 | suzuki | Low | 2 | 10 | | ReadDate(/share/folder/xyz/pqr.doc)[ERROR] |

FIG.10

| SESSION ID | USER NAME | PRIORITY | t | n | RESPONSE TIME | PRECEDING REQUEST | RESPONSE SIZE |
|---|---|---|---|---|---|---|---|
| 1 | tanaka | Middle | 6 | 0 | 1246872464.90335200 | GetList(/share/folder) | 18 |
| 5 | yamada | High | 10 | 1 | | WriteData(/user/yamada/abc/foo.txt) | 200byte |
| 8 | suzuki | Low | 2 | 10 | | ReadDate(/share/folder/xyz/pqr.doc)[ERROR] | 0 |

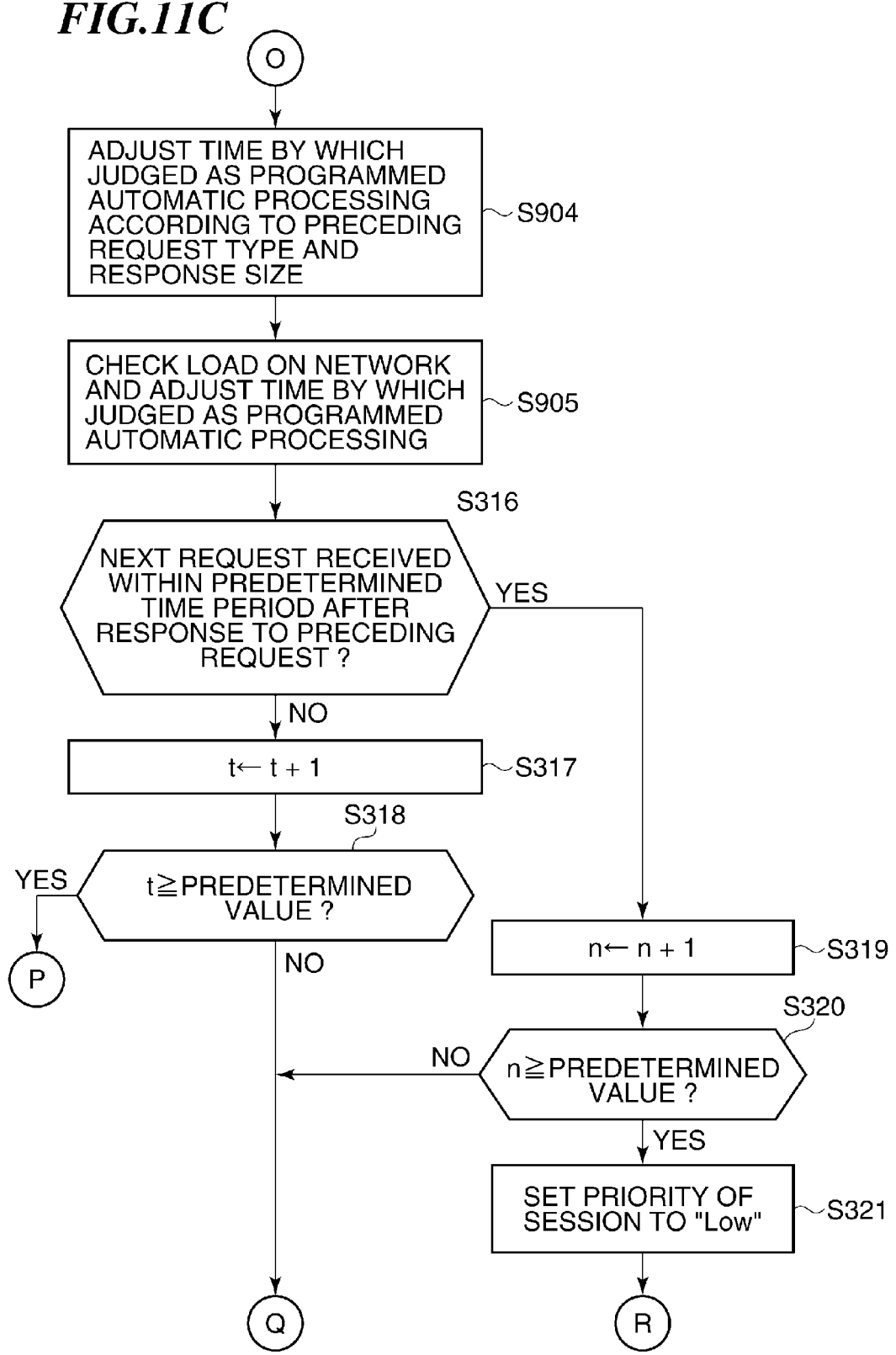

FIG.13

| SESSION ID | USER NAME | PRIORITY | t | n | RESPONSE TIME | ADDRESS | LOGOUT |
|---|---|---|---|---|---|---|---|
| 1 | tanaka | Middle | 6 | 0 | 1246872464.90335200 | 192.168.3.42 | No |
| 5 | yamada | High | 10 | 1 | 1246872513.90335200 | 192.169.21.186 | Yes |
| 8 | suzuki | Low | 2 | 10 | | 192.168.74.93 | No |

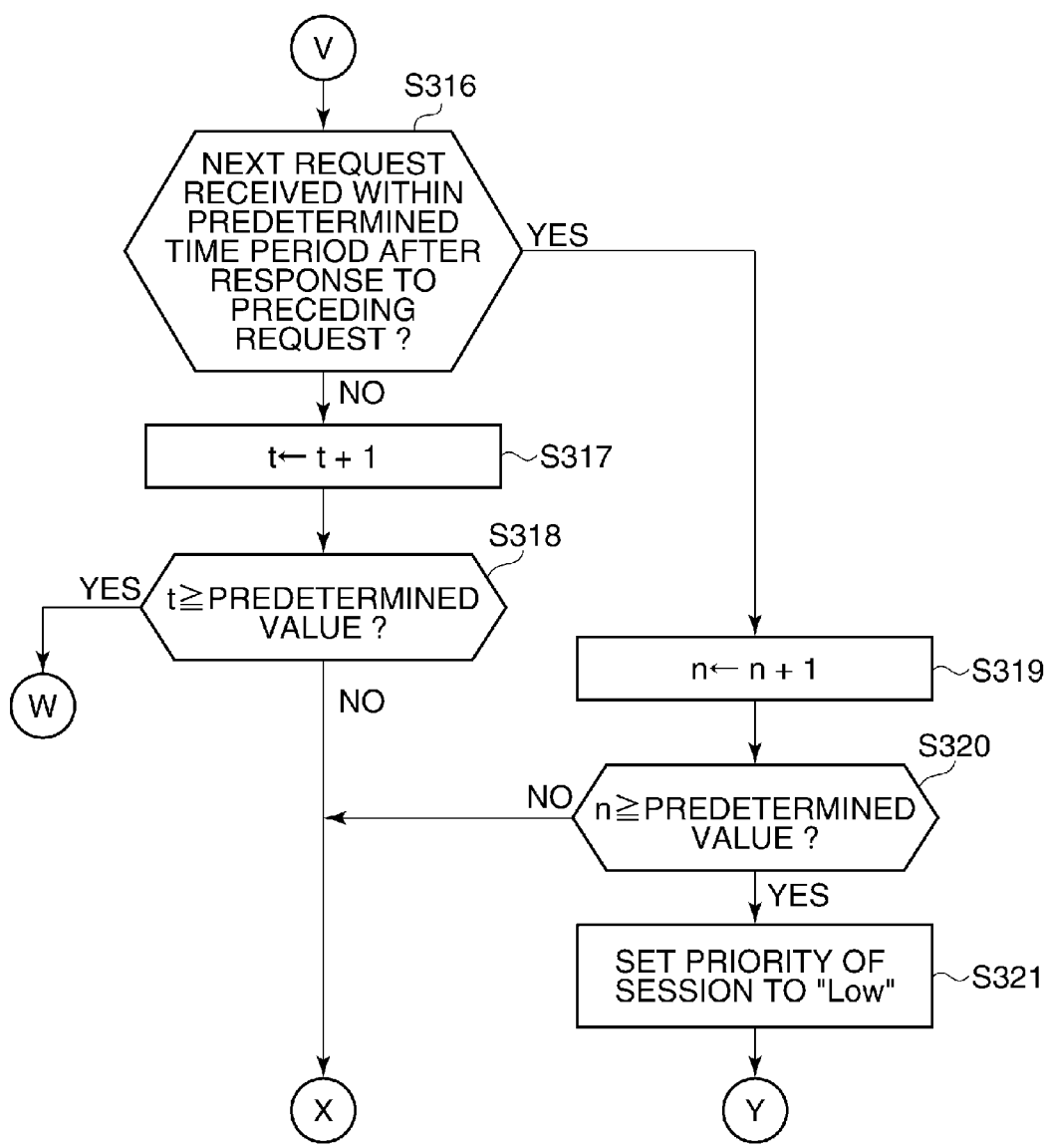

INFORMATION PROCESSING APPARATUS CAPABLE OF SETTING PROCESSING PRIORITY OF ACCESS, METHOD OF CONTROLLING THE INFORMATION PROCESSING APPARATUS, PROGRAM, AND STORAGE MEDIUM

This application is a U.S. National Phase Application of PCT International Application PCT/JP2010/073648, filed on Dec. 20, 2010, which is based on and claims priority from JP 2009-290966, filed on Dec. 22, 2009. The contents of the documents cited in this paragraph are hereby incorporated herein by reference in their entireties.

TECHNICAL FIELD

The present invention relates to an information processing apparatus, such as a printer, a copying machine, a multifunction peripheral, and a PC, which has a file server function connected to external apparatuses via a network, a method of controlling the information processing apparatus, a computer-executable program for causing a computer to execute the method, and a non-transitory computer-readable storage medium storing the program.

BACKGROUND ART

To make it possible to search data stored in a file server, a search server has been conventionally creating an index. The index is used for performing an efficient search of data. To create an index, the search server accesses a file server to read out data attributes, such as names, dates and times of update, and owners, and contents of all data files stored in the file server. The search server reads out the contents of data files for the sake of full-text search. Therefore, index creation by the search server puts a heavy load on the file server.

The index creation has conventionally been performed for creating an index for use in data search using a dedicated search server, and hence it is possible to perform scheduling of the index creation. Accordingly, the search server performs index creation during a time of day, such as late midnight hours, in which no problem is caused even if a heavy load is placed on the file server.

Further, for example, to reduce load placed by the search server, there has been proposed a file server that identifies a search server by a specific protocol or an IP address, and returns only an updated file list in response to an access from the search server (PTL (Patent Literature) 1).

CITATION LIST

Patent Literature

PTL 1: Japanese Laid-Open Patent Publication (Kokai) No. 2005-122702

SUMMARY OF INVENTION

Technical Problem

By the way, in recent years, it is possible to search data stored in a file server not only by a dedicated search server, but also by a search engine available in general user PCs. The search engine includes, for example, a Google (registered trademark) desktop search, a Windows (registered trademark) desktop search, and so on.

Therefore, this enables a large number of general users to use a search engine for executing index creation in respective timings by individual PCs, which makes it difficult to perform scheduling of the index creation differently from a conventional dedicated search server.

Further, since a general user PC serves as a search server, it is difficult to identify and control the search server, as in the above-mentioned PTL 1. That is, in a case where an access for index creation concentrates on a file server, it is impossible to distinguish the access for index creation from an access from other apparatuses not intending index creation, which causes the inconvenience of delay in response to such an access from the other apparatuses.

Particularly, in apparatuses which have a file server function in addition to original functions thereof, conflict occurs between an access to a storage device for index creation and an access to the storage device for execution of the original functions, causing degraded performance of the original functions. Further, some such apparatuses configured as above have a lower CPU processing capability than dedicated servers or PCs, or have a smaller memory capacity, and in such cases, they are more affected by the load due to index creation.

The present invention provides an information processing apparatus that gives priority to an access made by a usual manual operation for execution of original functions of an information processing apparatus, even when an automatically programmed access for index creation from an external apparatus to the storage and the access for execution of original functions occur concurrently, a method of controlling the information processing apparatus, a computer-executable program for causing a computer to execute the method, and a non-transitory computer-readable storage medium storing the program.

Solution to Problem

Accordingly, in a first aspect of the present invention, there is provided an information processing apparatus, comprising a request receiving unit configured to receive a processing request for execution of a processing, a priority management unit configured to set a priority on a processing-by-processing basis, a processing execution unit configured to execute processing of which execution is requested by the processing request received by the request receiving unit, based on a priority thereof set by the priority management unit, a responding unit configured to return a response of a result of a processing executed by the processing execution unit to a requesting source of the processing request, a judgment unit configured to judge whether or not the processing request received by the request receiving unit is a specific request, a counting unit configured to count the number of times that a time period elapsed after returning of the response from the responding unit to the requesting source until receipt of a next processing request by the request receiving unit is within a predetermined time period, when it is judged by the judgment unit that the processing request is a specific request, and a determination unit configured to determine whether or not to change the priority set by the priority management unit to a low priority, based on the number of times counted by the counting unit.

Accordingly, in a second aspect of the present invention, there is provided an information processing apparatus, comprising a request receiving unit configured to receive a processing request for execution of a processing, a priority management unit configured to set a priority on a processing-by-processing basis, a processing execution unit configured to execute processing of which execution is requested by the processing request received by the request receiving unit, based on a priority thereof set by the priority management unit, a responding unit configured to return a response of a result of a processing executed by the processing execution unit to a requesting source of the processing request, a judgment unit configured to judge whether or not the processing request received by the request receiving unit is a specific request, a counting unit configured to count the number of times that a time period elapsed after returning of the response from the responding unit to the requesting source until receipt of a next processing request by the request receiving unit exceeds a predetermined time period, when it is judged by the judgment unit that the processing request is a specific request, and a determination unit configured to determine whether or not to change the priority set by the priority management unit to a high priority, based on the number of times counted by the counting unit.

Accordingly, in a third aspect of the present invention, there is provided a method of controlling an information processing apparatus, comprising receiving a processing request for execution of a processing, setting a priority on a processing-by-processing basis, executing processing of which execution is requested by the received processing request, based on a set priority thereof, returning a response of a result of the executed processing to a requesting source of the processing request, judging whether or not the receive processing request is a specific request, counting the number of times that a time period elapsed after returning of the response to the requesting source until receipt of a next processing request is within a predetermined time period, when it is judged that the processing request is a specific request, and determining whether or not to change the set priority to a low priority, based on the counted number of times.

Accordingly, in a fourth aspect of the present invention, there is provided a method of controlling an information processing apparatus, comprising receiving a processing request for execution of a processing, setting a priority on a processing-by-processing basis, executing processing of which execution is requested by the received processing request, based on a set priority thereof, returning a response of a result of the executed processing to a requesting source of the processing request, judging whether or not the receive processing request is a specific request, counting the number of times that a time period elapsed after returning of the response to the requesting source until receipt of a next processing request exceeds a predetermined time period, when it is judged that the processing request is a specific request, and determining whether or not to change the set priority to a high priority, based on the counted number of times.

Accordingly, in a fifth aspect of the present invention, there is provided a computer-executable program for causing a computer to execute a method of controlling an information processing apparatus, wherein the method comprises receiving a processing request for execution of a processing, setting a priority on a processing-by-processing basis, executing processing of which execution is requested by the received processing request, based on a set priority thereof, returning a response of a result of the executed processing to a requesting source of the processing request, judging whether or not the receive processing request is a specific request, counting the number of times that a time period elapsed after returning of the response to the requesting source until receipt of a next processing request is within a predetermined time period, when it is judged that the processing request is a specific request, and determining whether or not to change the set priority to a low priority, based on the counted number of times.

Accordingly, in a sixth aspect of the present invention, there is provided a computer-executable program for causing a computer to execute a method of controlling an information processing apparatus, wherein the method comprises receiving a processing request for execution of a processing, setting a priority on a processing-by-processing basis, executing processing of which execution is requested by the received processing request, based on a set priority thereof, returning a response of a result of the executed processing to a requesting source of the processing request, judging whether or not the receive processing request is a specific request, counting the number of times that a time period elapsed after returning of the response to the requesting source until receipt of a next processing request exceeds a predetermined time period, when it is judged that the processing request is a specific request, and determining whether or not to change the set priority to a high priority, based on the counted number of times.

Accordingly, in a seventh aspect of the present invention, there is provided a non-transitory computer-readable storage medium storing a computer-executable program according to the above-discussed fifth aspect of the present invention.

Accordingly, in a eighth aspect of the present invention, there is provided a non-transitory computer-readable storage medium storing a computer-executable program according to the above-discussed sixth aspect of the present invention.

Advantageous Effects of Invention

According to the present invention, it is possible to set priority to an access made by a manual operation for execution of functions of the information processing apparatus over an automatically programmed access from an external apparatus.

The features and advantages of the present invention will become more apparent from the following detailed description taken in conjunction with the accompanying drawings.

BRIEF DESCRIPTION OF DRAWINGS

[FIG. 4C] A continuation of FIG. 4B.

[FIG. 5] A diagram showing an example of a list of requests from applications.

[FIG. 6] A diagram showing an example of a session management table.

[FIG. 7] A diagram showing an example of a session management table used in an image forming apparatus as an information processing apparatus according to a second embodiment of the present invention.

[FIG. 10] A diagram showing an example of a session management table used in an image forming apparatus as an information processing apparatus according to a third embodiment of the present invention.
[FIG. 11C] A continuation of FIG. 11B.
[FIG. 13] A diagram showing an example of a session management table used in an image forming apparatus as an information processing apparatus according to a fifth embodiment of the present invention.
[FIG. 14C] A continuation of FIG. 14B.

DESCRIPTION OF EMBODIMENTS

The present invention will now be described in detail below with reference to the accompanying drawings showing embodiments thereof.

Figure 1:
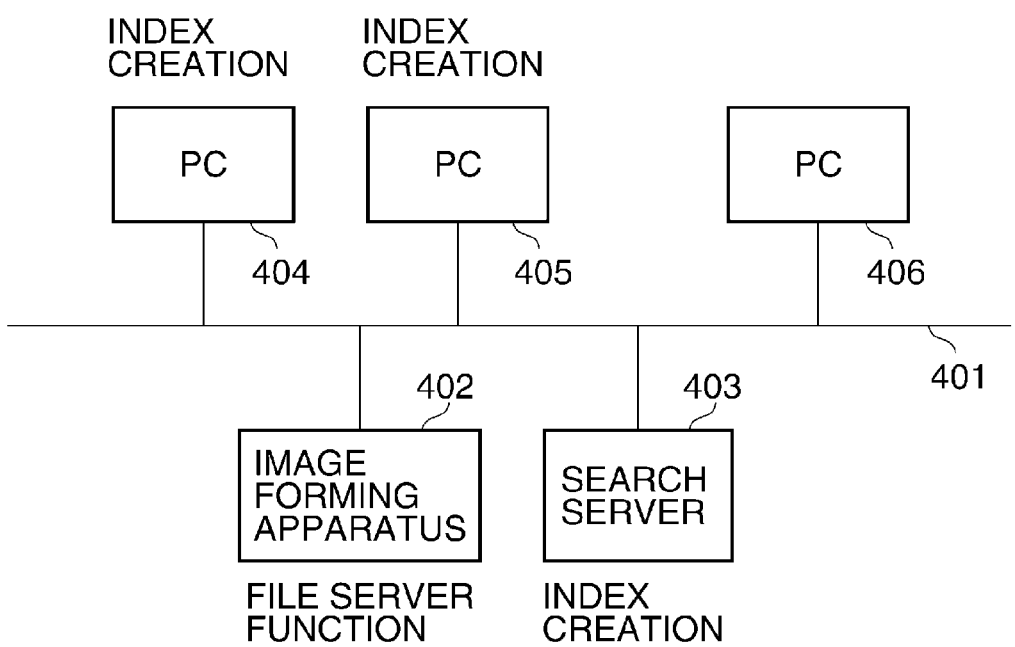
[FIG. 1] A block diagram of a network system including an image forming apparatus as an information processing apparatus according to a first embodiment of the present invention.

FIG. 1 is a block diagram of a network system including an image forming apparatus as an information processing apparatus according to a first embodiment of the present invention.

In the system shown in FIG. 1, the image forming apparatus 402 as the information processing apparatus according to the present embodiment, a search server 403, and user PCs 404 to 406 are connected to a network 401, such as a LAN, such that they can communicate with each other.

The image forming apparatus 402 has a file server function, and the search server 403 and the user PCs 404 and 405 have an index creation function for search. Therefore, it is possible to access to the image forming apparatus 402 having the file server function, for index creation, from the search server 403 and the user PCs 404 and 405.

Figure 2:
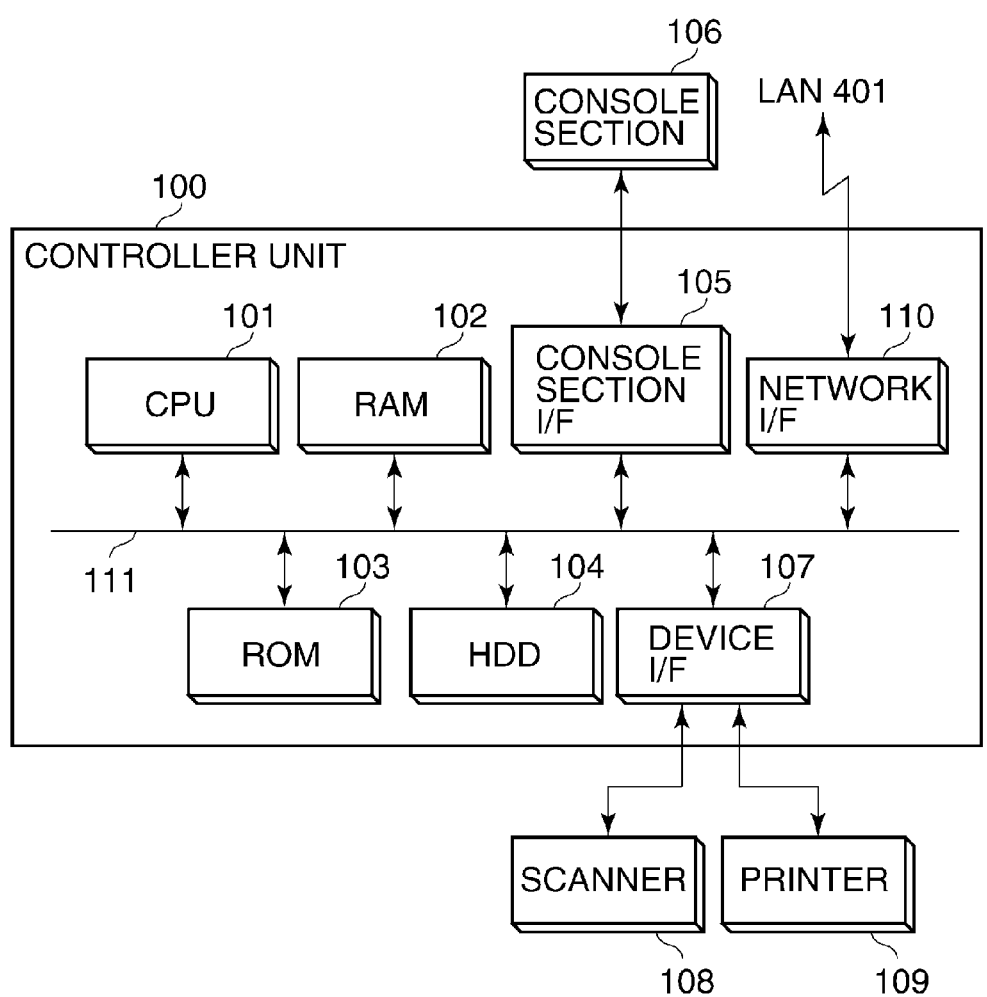
[FIG. 2] A block diagram of the image forming apparatus.

FIG. 2 is a block diagram of the image forming apparatus 402 of the present embodiment.

As shown in FIG. 2, the image forming apparatus 402 comprises a controller unit 100, a console section 106 connected to the controller unit 100, a scanner 108, and a printer 109.

The controller unit 100 includes a CPU 101, a RAM 102, a ROM 103, an HDD 104, a console section interface 105, a device interface 107, and a network interface 110, which are interconnected via a system bus 111.

The CPU 101 controls the overall operation of system components connected to the system bus 111, including those mentioned above. The RAM 102 is a system work memory for use in the operation of the CPU 101, and at the same time, is an image memory for temporarily storing image data. The RAM 102 also stores programs of an operating system, system software, application software, and so forth.

The ROM 103 stores a system boot program. Further, the ROM 103 sometimes stores system programs and application programs, and also sometimes stores information necessary for the image forming apparatus 402, including fonts.

The HDD 104 stores the operating system, the system software, the application software, image data, etc. The CPU 101 executes the programs stored in the RAM 102, and processes image data and other data stored in the RAM 102, the ROM 103, and the HDD 104. It should be noted that the software and image data may be stored in the ROM 103, an SSD (Solid State Disk), or the like, in place of the HDD 104.

The console section 106 is connected to the console section interface 105. The console section 106 includes a display device, such as a touch panel, for displaying a status of the image forming apparatus 402, and has operation buttons arranged thereon for giving instructions to the image forming apparatus 402.

The scanner 108 and the printer 109 as devices for inputting and outputting image data are connected to the device interface 107. Image data input from the scanner 108 via the device interface 107 is stored in the RAM 102 and the HDD 104, and image processing is performed on the stored image data by an associated application program stored in the RAM 102 as required. Image data on which image processing or the like is performed is output to the printer 109 via the device interface 107.

The network 401, such as a LAN, is connected to the network interface 110, and the network interface 110 inputs and outputs image data, and information for controlling the image forming apparatus 402.

It should be noted that in the case of an image forming apparatus having a facsimile function, the image forming apparatus may be connected to a public communication line via a modem interface, not shown, for enabling facsimile transmission. Further, for example, a USB interface, not shown, may be provided to make it possible to read out and print data stored in a flash memory card or the like.

Figure 3:
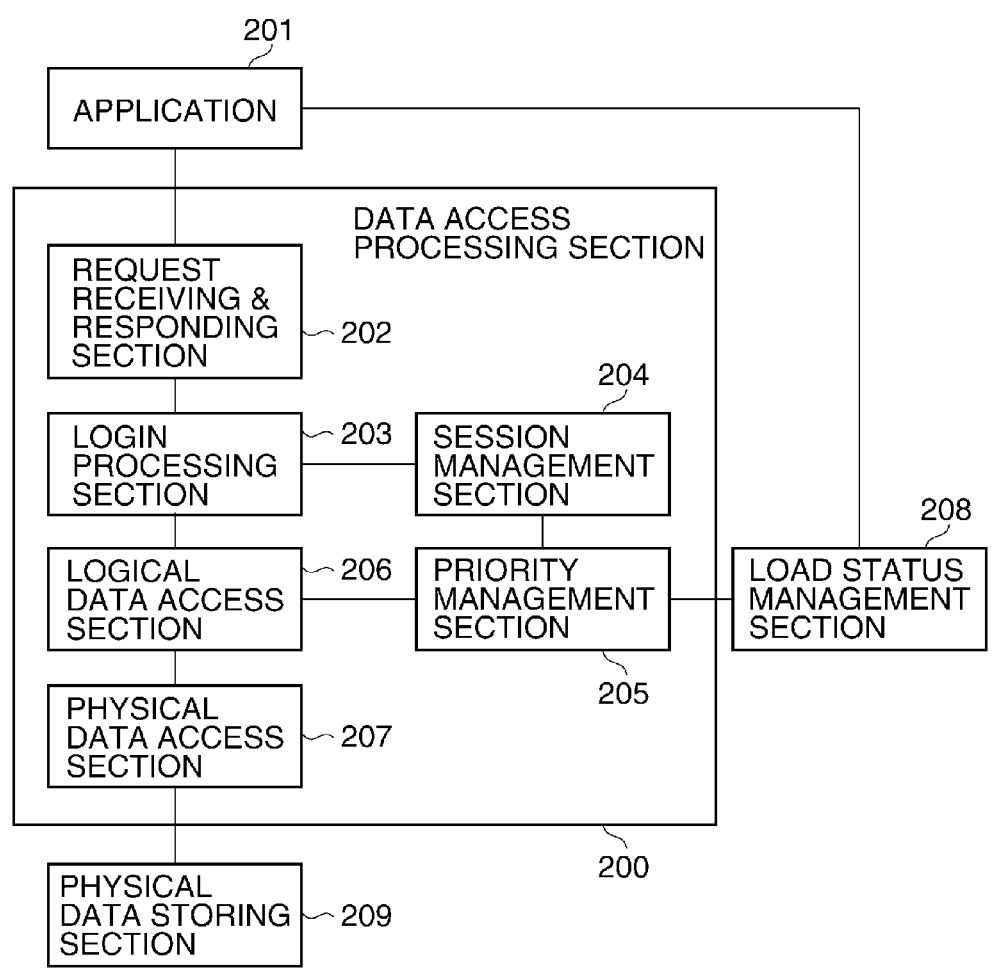
[FIG. 3] A functional block diagram of a data access processing section of the image forming apparatus.

FIG. 3 is a functional block diagram of a data access processing section of the image forming apparatus 402 of the present embodiment. In FIG. 3, the blocks correspond to respective software modules, and data in FIG. 3 is intended to mean image data, and data files stored in the image forming apparatus 402 when it functions as a file server.

In FIG. 3, reference numeral 2000 denotes the data access processing section 200, an application 201 and the data access processing section 200 are stored in the HDD 104 or the ROM 103. The application 201 and the data access processing section 200 correspond to the programs which are loaded into the RAM 102 and are executed by the CPU 101.

Here, the application 201 executes the functions of the image forming apparatus 402. The application 201 includes various kinds of applications provided on a function-by-function basis, such as an application of a print function for printing data transmitted from an external PC by the printer 109, and an application of a copy function for duplicating data read by the scanner 108.

The application 201 calls the data access processing section 200 when data access is required.

The data access processing section 200 checks a location of a data file requested by the application 201 and read out the data file from a physical data storage unit 209, or writes a data file into the physical data storage unit 209. Further, the data access processing section 200 not only reads and writes data files but also acquires attributes of data files.

Although only one physical data storage unit 209 is shown in FIG. 3, it is possible to switch between a plurality of physical data storage units 209 according to the location of the data file requested by the application 201. For example, when it is desired to store a data file in the image forming apparatus itself, the HDD 104 is selected as the physical data storage unit 209, whereas it is desired to store a data file in an external apparatus connected to the network 401, the external apparatus connected via the network interface 110 is selected as the physical data storage unit 209.

A load status management section 208 manages the load status of the image forming apparatus. It is assumed that in the present embodiment, the load status is represented by a load evaluation value indicative of a status of load on the image forming apparatus. Specific examples of load on the image forming apparatus in the present embodiment are as follows: The load represents one or more of load on the CPU 101 due to execution of programs, load on the HDD 104 due to disk access, and load on the network interface 110 due to transmission and receipt of data to and from the network 401.

When the application 201 is performing processing, the application 201 notifies the load status management section 208 of addition of load, so that the load evaluation value indicative of the load status of the image forming apparatus 402 monitored by the load status management section 208 becomes high. Regardless of the kind of applications, whenever addition of load is notified from the application 201, the load evaluation value indicative of the load status of the image forming apparatus 402 monitored by the load status management section 208 becomes higher. When processing performed by the application 201 is terminated, the application 201 notifies the load status management section 208 of removal of load, so that the load evaluation value indicative of the load status of the image forming apparatus 402 monitored by the load status management section 208 becomes lower.

A description will be given of the operation of the load status management section 208 based on a specific example. When the application 201 performs processing, the load status management section 208 increments the load evaluation value indicative of the load status of the image forming apparatus 402 monitored thereby by 1, and when the application 201 terminates processing, the load status management section 208 decrements the load evaluation value indicative of the load status of the image forming apparatus 402 monitored thereby by 1.

If an application A starts processing in a state where the application 201 does not perform processing, the application 201 notifies the load status management section 208 of addition of load, so that the load evaluation value indicative of the load status of the image forming apparatus 402 monitored by the load status management section 208 is incremented by 1. Further, if an application B starts processing, the application 201 notifies the load status management section 208 of addition of load, so that the load evaluation value indicative of the load status of the image forming apparatus 402 monitored by the load status management section 208 is incremented to become equal to +2.

Thereafter, when the application A terminates processing, the application 201 notifies the load status management section 208 of removal of load, so that the load evaluation value in the load status management section 208 is decremented by 1 to become equal to +1. Thus, when a number of applications are simultaneously executed in the application 201, the load evaluation value indicative of the load status of the image forming apparatus 402 monitored by the load status management section 208 becomes high. Although in the above-described example, the load evaluation value in the load status management section 208 is changed using the same value for all applications, the load evaluation value may be changed in a more finely variable manner by weighting.

For example, a magnitude of a load equivalent value to be added or deleted to or from the load evaluation value indicative of the load status may be determined on an application-by-application basis or may be determined for each internal processing of the application on an application internal processing-by-application internal processing basis. For example, an application for print processing involves execution of the PDL (Page Description Language) analysis processing, and hence the load equivalent value of the application may be set to a larger value.

Further, although in the present embodiment, the load status is judged based on the addition and removal of load notified from each application of the system to the load status management section 208, the load status may be managed by any other suitable method.

For example, the load status management section 208 may be configured to acquire a usage ratio of the CPU 101, and increase or decrease the evaluation value of the load status according to the usage ratio provided that a change in the usage ratio is not smaller than a predetermined value. In this case, since the usage ratio of the CPU 101 incessantly changes, the load status management section 208 acquires the usage ratio at predetermined time intervals to thereby update the evaluation value of the load status.

Further, the load status management section 208 may change the evaluation value of the load status based on a status of access to the HDD 104 by checking an I/O queue, not shown. Further, the load status management section 208 may detect traffic in the network interface 110 to update the evaluation value of the load status. Since the status of access to the HDD 104 and the traffic in the network interface 110 also incessantly change, the load status management section 208 acquires the access status and/or the traffic at predetermined time intervals to update the evaluation value of the load status.

In short, the load status management section 208 may update the evaluation value of the load status based on various kinds of load on the system. Further, the load status management section 208 may combine the notification from the application 201 to the load status management section 208 and one or more system load status detected by the load status management section 208 as described above to thereby update the evaluation value of the load status.

It should be noted that whether or not there is much load placed on the image forming apparatus 402 is determined by determining whether or not the evaluation value of the load status is larger a predetermined value with reference to which it is determined that the load is high. The predetermined value with reference to which it is determined that the load is high varies with the above-described configuration of the evaluation value of the load status, and is determined in advance by executing an operation in which processing can be completed without delay, for example.

The data access processing section 200 controls data access to image data, and data files stored in the image forming apparatus 402 when it functions as a file server. The data access processing section 200 includes a request receiving & responding section 202 for receiving a data access request and returning a result of processing of the request, a login processing section 203 for performing authentication and authority confirmation for data access, and a session management section 204 for managing currently logged-in sessions. The data access processing section 200 further includes a priority management section 205 for setting processing priority of each session, a logical data access section 206 for executing logical data access, and a physical data access section 207 for executing physical data access.

The processing priority managed by the priority management section 205 is classified into three levels, i.e. Low, Middle, and High, and is set for each session. The default setting of the processing priority of a session is Middle. For a session of a mechanical access from the outside, such as an access for index creation, the processing priority of the session is set to Low. For a session assumed to be based on a user's operating the image forming apparatus 402, the processing priority of the session is set to High.

By varying the processing priority, it is possible to control the order of processes to be executed in the respective sessions. Although described in detail hereinafter with reference to FIGS. 4A to 4C, a process to be executed in a session for which the processing priority is set to High is given top priority in execution. As for a process to be executed in a session for which the processing priority is set to Low, if there is a process to be executed in a session having a higher priority, a wait process is carried out to give priority to the process of the session having a higher priority. The processing priorities of respective sessions are stored in a session management table shown in FIG. 6. The session management table will be described hereinafter.

Although in the present embodiment, the processing priority is classified into the three levels of Low, Middle, and High, this is not limitative, but the processing priority may be classified into two levels or four or more levels.

Now, let it be assumed that an access to the image forming apparatus 402 has been occurring from the search server 403, and the user PCs 404 and 405, shown in FIG. 1, for index creation. At this time, concurrently with the above-mentioned access for index creation, if the user PC 406 requests a normal data access, which is not an access for index creation, to the image forming apparatus 402, the image forming apparatus 402 is required to give a higher priority to execution of this request from the user PC 406. Further, also if execution of the copy function or the like is instructed from the console section 106 to the image forming apparatus 402, the image forming apparatus 402 is required to give a higher priority to execution of the function instructed from the console section 106.

Next, a description will be given of a data access process including processing priority setting, which is executed by the data access processing section 200 of the image forming apparatus 402, with reference to FIGS. 4A to 4C. This data access process is executed by the CPU 101 loading a data access-processing program stored in the HDD 104 or the ROM 103 of the image forming apparatus 402 into the RAM 102.

First, in response to an instruction for data access processing received from the application 201, the CPU 101 calls up the data access processing section 200 to start the present process with a step S301.

In the step S301, when the request receiving & responding section 202 receives a request from the application 201, the CPU 101 proceeds to a step S302. Here, the request is intended to mean a request related to handling of a data file stored in the HDD 104 or the like or attributes of a data file, or a request related to data access, such as authentication and authority confirmation, for accessing a data file.

FIG. 5 shows an example of a list of requests from the application 201. A left-side column as viewed in FIG. 5 shows request types, and a right-side column as viewed in FIG. 5 shows API (Application Interface) names of the data access processing section 200 each called up by an associated application according to the request type. The application 201 calls up an API to thereby make a request to the data access processing section 200.

The request type includes a "login" request for authentication to access a data file and a "logout" request for cancellation of authentication, a "file creation" request for creating a data file, and a "file deletion" request for deleting a data file.

The request type further includes a "file opening" request, a "file closing" request, a "file reading" request, a "file writing" request, and a "file seeking" request, for reading and writing the contents of a data file. For example, in reading data, the "file opening" is executed on a data file, the "file seeking" is executed to shift to a desired location within the data file, and the "file reading" is executed to read contents of the data file. After the reading of data is completed, reading of the contents of the data file is terminated by executing the "file closing".

As types of the request for handling folders (directories), there are a "folder creation" request, a "folder deletion" request, a "folder modification" request, a "folder opening" request, a "folder closing" request, and a "folder reading" request. Further, there is a "folder list acquisition" request for acquiring a list of folders (subfolders) and files.

The request type further includes an "authority change" request, an "owner change" request, an "attribute acquisition" request, an "attribute setting" request, and a "name change" request, for changing attributes of data files and folders, and a "copy" request for executing duplication of a data file. It should be noted that the requests which can be processed by the request receiving & responding section 202 are not limited to those shown in FIG. 5.

In the step S302, the CPU 101 determines, by the request receiving & responding section 202, whether or not the request received thereby is a login request, and if the request is a login request, the CPU 101 proceeds to a step S303, whereas if the request is not a login request, the CPU 101 proceeds to a step S310.

In the step S303, the CPU 101 executes, by the login processing section 203, login processing to thereby identify a user who is performing data access, and then the CPU 101 proceeds to a step S304. At this time, the login request from the application 201 contains information required for login processing, such as a user name and a password. Further, if the application 201 or a module, not shown, has already performed login, a security token associated with the login may be contained in the login request. In this case, the login processing section 203 confirms the security token to identify the user who is performing data access. The method of identifying a user who is performing data access is not particularly limited.

In the step S304, the CPU 101 creates, by the session management section 204, a session based on the user identified in the step S302, and the CPU 101 proceeds to a step S305. The session here is intended to means information for making it possible to execute a data access request until logout processing is executed.

In the step S305, the CPU 101 sets, by the session management section 204, each of variables n and t to an initial value of 0 and clear a response time, and then proceeds to a step S306. Here, the variable n represents the number of times that a time interval between one request and the next request during the session is within a predetermined time period.

That is, the variable n represents the number of accesses each regarded as one for index creation from the search server 403 on condition that the request was made in succession at a time interval impossible for manual operation. The number of the variable n includes not only the number of accesses for index creation from the search server 403 but also the number of accesses which were made not by manual operation but by programmed automatic processing, such as script processing. Further, although described hereinafter, even when the user is operating the console section 106 of the image forming apparatus 402, there is also a possibility that request is made in succession at high speed by accident, and hence on condition that the variable n is not less than the predetermined number, it is determined that an access by programmed automatic processing is been made, as in the case of the access for index creation.

On the other hand, contrary to the variable n, the variable t represents the number of times that the time interval between one request and the request following the one request is longer than the predetermined time period. That is, "t" represents the number of accesses each regarded as one made by the user actually operating the console section 106 of the image forming apparatus 402 or an application for accessing the file server of the PC on condition that the request is made in succession at a time interval longer than the time interval of those each regarded as one made by mechanical operation, i.e. by programmed automatic processing. Although described hereinafter, even when the search server is executing index creation, there is a possibility that the request is made in succession at a time interval longer than an expected time period due to traffic of the network, and hence on condition that the variable t is not less than the predetermined number, it is determined that the access is being made by user's operation.

Further, the response time indicates a time at which a result of the received request is returned to the requesting source. By determining a time interval between a time of response i.e. returning of the result to one request and a time of receipt of a request following the one request i.e. the present request, it is determined whether or not the access is mechanically made.

Now, a description will be given of an example of determination of whether or not an access is made by programmed automatic processing.

For example, the response time is expressed by the number of milliseconds which have elapsed from 00:00:00, Jan. 1, 1970. After the result of one request is returned, if a next request following the one request i.e. the present request is received before the lapse of 800 milliseconds, it is determined that the present access has been made by programmed automatic processing. For example, assuming that the time at which the result is returned to the requesting source is 15:44:6.937, Jul. 31, 2009, the response time has a value of 1249022646953. Assuming that the next request from the session is received at 15:44:7.179, Jul. 31, 2009, the time of reception of the request represented by the seconds elapsed from 00:00:00, Jan. 1, 1970 has a value of 1249022647205. The interval between the returning of the result of the preceding request and the receipt of the present request is 252 milliseconds, which is calculated from the difference between the two values of the seconds elapsed from 00:00:00, Jan. 1, 1970. By determining whether or not the value of the interval thus determined is within a predetermined value (800 milliseconds), it is determined whether or not the access has been made by programmed automatic processing, and in the present example, it is determined that the access has been made by programmed automatic processing.

It should be noted that although in the above-described example, the time units are milliseconds, the response time at which the result is returned to the application 201 may be recorded by time units which are accurate enough to perform determination as to whether an access has been made by programmed automatic processing, such as microseconds. The variables n and t and response time initialized in the step S305 are held on a session-by-session basis and are managed by the session management section 204.

FIG. 6 is a diagram showing an example of the session management table managed by the session management section 204.

The session management section 204 manages information related to sessions using the session management table. The session management table records session IDs for identifying sessions, names of users who are using the sessions, processing priorities of the sessions, values of the above-mentioned variables t and n, and response times.

In the session management table shown in FIG. 6, for example, in the case of a session having a session ID of 1, the user name is "tanaka", the processing priority is "Middle", the variable t has a value of 6, the variable n has a value of 0, and the response time is 1246872464.90336200. Further, in the case of a session having a session ID of 5, the user name is "yamada", the processing priority is "High", the variable t has a value of 10, the variable n has a value of 1, and since the processing priority is set to High, the response time is not recorded. In the case of a session having a session ID of 8, the user name is "suzuki", the processing priority is "Low", the variable t has a value of 2, the variable n has a value of 10, and since the processing priority is set to Low, the response time is not recorded. It should be noted that in this example of the session management table shown in FIG. 6, the time units for measuring a time period elapsed from 00:00:00, Jan. 1, 1970, which indicates the response time, are microseconds.

Figure 4A:
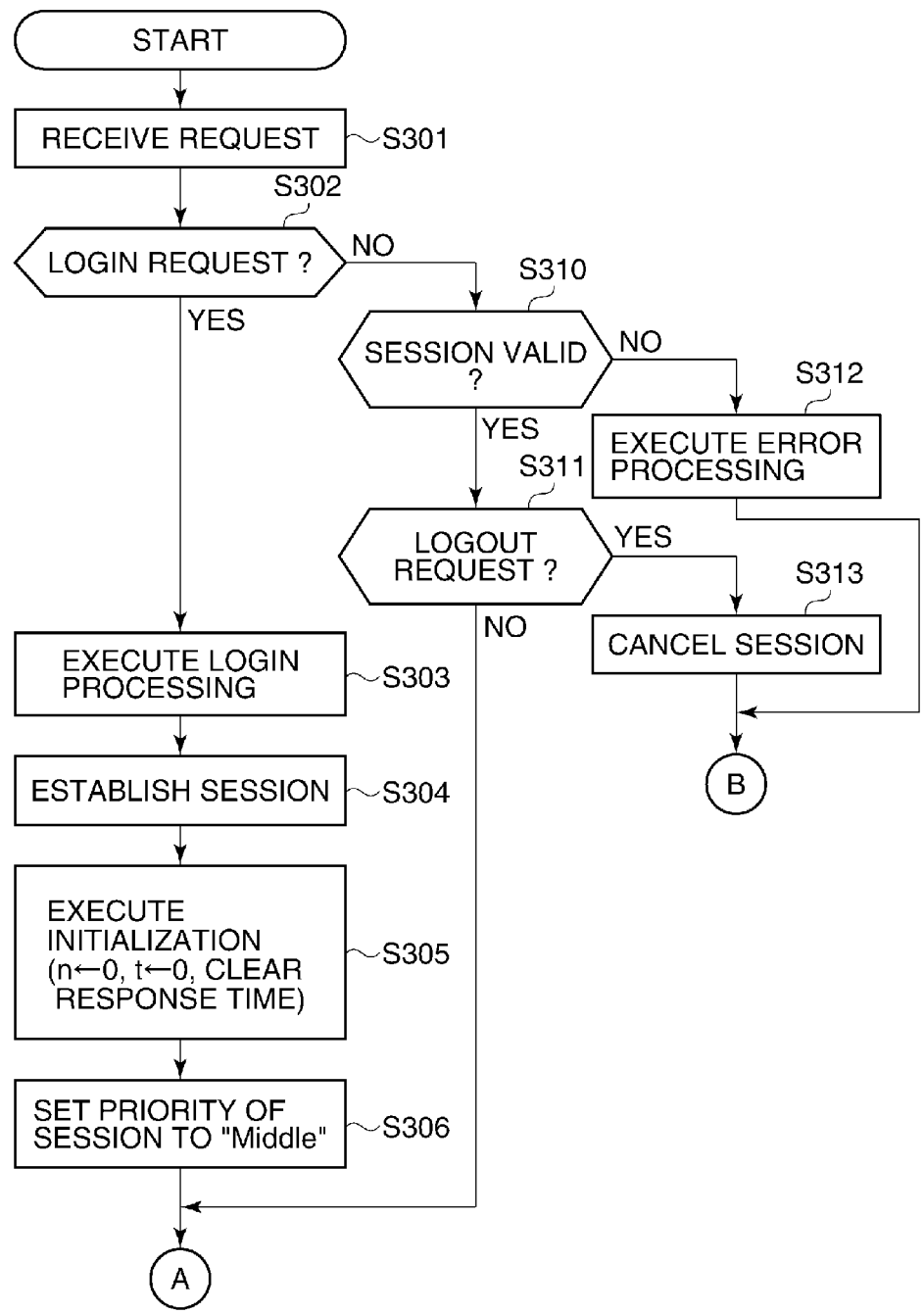
[FIG. 4A] A flowchart of a data access process including processing priority setting, which is executed by the data access processing section.
Figure 4B:
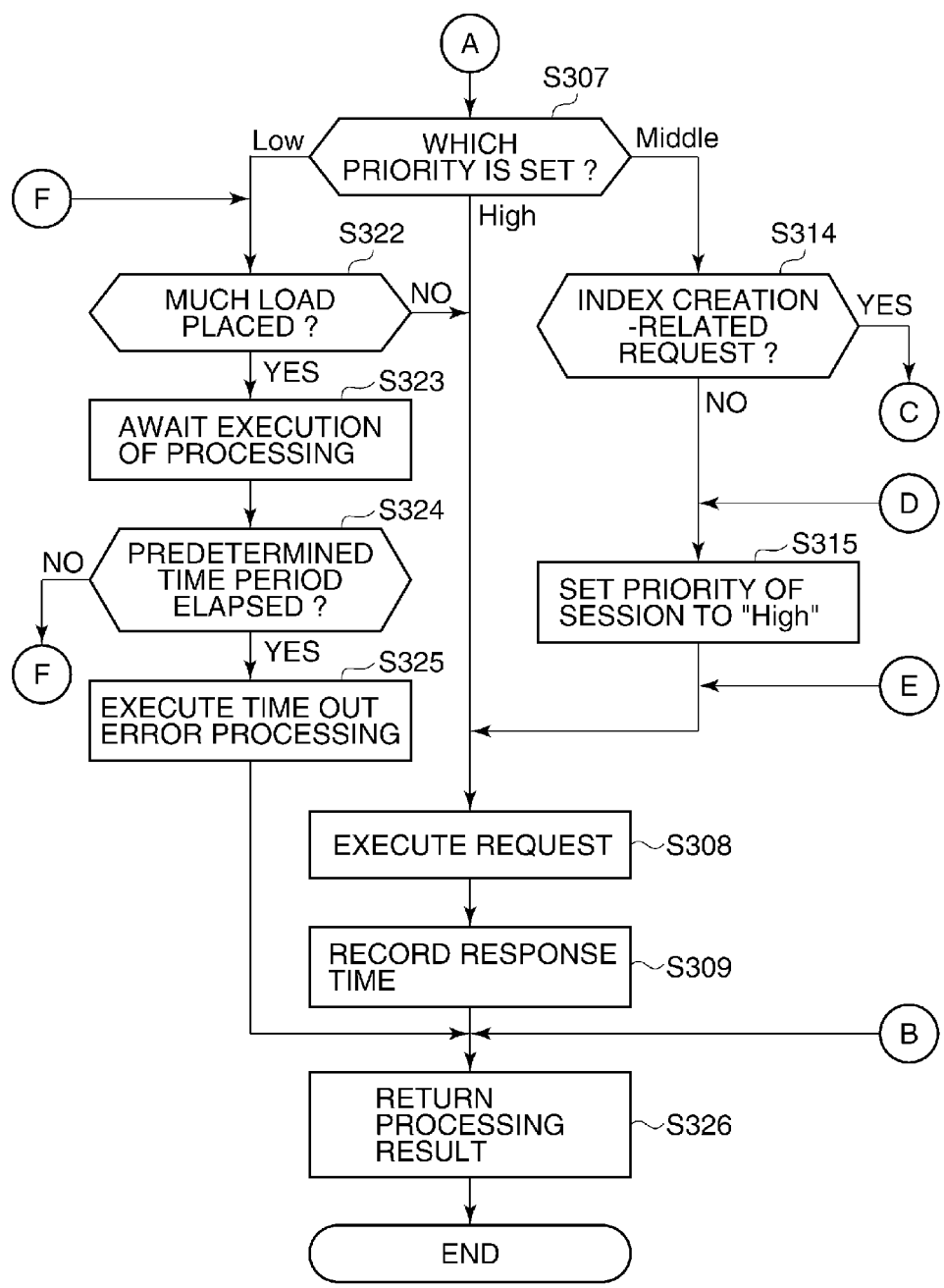
[FIG. 4B] A continuation of FIG. 4A.

In the step S306, the CPU 101 sets, by the priority management section 205, the processing priority of the present session in the session management table managed by the session management section 204 to Middle, and then proceeds to a step S307 in FIG. 4B.

On the other hand, in the step S310, the CPU 101 checks, by the session management section 204, the session information held thereby and determines whether or not the session contained in the request from the application 201 is valid. Then, if it is determined by the session management section 204 that the session is valid, the CPU 101 proceeds to a step S311, whereas if it is determined that the session is not valid, the CPU 101 proceeds to a step S312.

In the step S312, since the session is invalid, the CPU 101 executes, by the session management section 204, error processing. In this error processing, the session management section 204 performs post-processing such as clearing the session. After the error processing, the CPU 101 proceeds to a step S326 in FIG. 4B, wherein the CPU 101 returns, by the request receiving & responding section 202, the result that an error has occurred (in the case of this example) to the application 201 which is the requesting source, followed by terminating the present process.

In the step S311, the CPU 101 determines, by the request receiving & responding section 202, whether or not the request from the application 201 is a logout request, and if the request is a logout request, the CPU 101 proceeds to a step S313, whereas if the request is not a logout request, the CPU 101 proceeds to the step S307 in FIG. 4B.

In the step S313, the CPU 101 cancels, by the session management section 204, the session, and then proceeds to the step S326 in FIG. 4B. In the step S326, the CPU 101 returns, by the request receiving & responding section 202, the result of execution of logout processing (in the case of this example) to the application 201 which is the requesting source, followed by terminating the present process.

In the step S307 in FIG. 4B, the CPU 101 checks, by the priority management section 205, the processing priority of the session in the session management table managed by the session management section 204.

Then, if the processing priority of the session is "High", the CPU 101 proceeds to a step S308, if the processing priority is "Middle", the CPU 101 proceeds to a step S314, or if the processing priority is "Low", the CPU 101 proceeds to a step S322.

In the step S308, since the processing priority is "High", it is judged that the session is operated by the user, so that the CPU 101 executes the requested process. Here, the CPU 101 shifts to control the physical data access section 207 and causes the same to handle the requested data file, and then the CPU 101 proceeds to a step S309.

In the step S309, the CPU 101 records the time of response to the request from the application 201, and then proceeds to the step S326. It should be noted that in the step S309, the response time may be recorded not in all cases but only in the case where the processing priority is not "High".

In the step S326, the CPU 101 returns, by the request receiving & responding section 202, the result of execution of the processing requested from the application 201 to the application 201, followed by terminating the present process.

In the steps S322 et seq., since the processing priority is "Low", it is determined that for the session, the access has been made by programmed automatic processing for index creation or the like, the requested process is executed only when it is determined that there is not much load placed on the image forming apparatus 202.

In the step S322, the CPU 101 queries, by the priority management section 205, the load status management section 208 to acquire the evaluation value of the current load status, and determine whether or not there is much load placed on the image forming apparatus 402.

Then, if much load is not placed, the request from the application 201 is permitted to be executed, so that the CPU 101 proceeds to the step S308, and thereafter, similarly to the above-mentioned case where the processing priority is "High", the steps S308, S309, and S326 are executed, followed by terminating the present process.

On the other hand, if it is determined that much load is placed, the CPU 101 proceeds to a step S323.

In the step S323, the CPU 101 awaits (postpones), by the priority management section 205, execution of the process for a certain time period, and then proceeds to a step S324. This causes execution of the process to be delayed, and if there is another process which is concurrently being executed and is higher in the processing priority, the other process is preferentially executed.

In the step S324, the CPU 101 determines, by the priority management section 205, whether or not a predetermined or longer time period has elapsed after receipt of the request, and if the predetermined or longer time period has elapsed, the CPU 101 proceeds to the step S302, whereas if not, the process returns to the step S322.

In a step S325, the CPU 101 performs, by the priority management section 205, time out error processing. More specifically, the CPU 101 sets, by the priority management section 205, the response time set to 0 via the session management section 204 so as to invalidate the interval until a next request is received, and then proceeds to the step S326.

In the step S326, the CPU 101 returns, by the request receiving & responding section 202, the result of execution of the request as the time out error (in the case of this example) to the application 201, followed by terminating the present process.

In the steps S314 et seq., since it is determined that the processing priority is "Middle", the session is in a state where it has not been determined whether the access has been made by programmed automatic processing for index creation or the like, or by user's operation.

In the step S314, the CPU 101 determines, by the logical data access section 206, whether or not the request from the application 201 is a request for index creation.

Then, if the CPU 101 determines that the present request is a request for index creation, the CPU 101 proceeds to a step S316, whereas if it is not a request for index creation, the CPU 101 proceeds to a step S315.

In general, an index creation process in apparatuses, such as the search server 403 and the user PCs 404 and 405, is executed as follows:

The apparatus that executes the index creation process searches a folder structure stored in the file server to acquire data attribute information on data files and contents of data files.

That is, the request used for index creation by an apparatus that executes the index creation process is limited to a type related to acquisition of a list of folders (subfolders) and data files, acquisition of data attributes, and reading of data, but not a type related to edition for rewriting the contents of data files.

Therefore, in the step S314, it is determined whether or not the request is such an index creation-related request as mentioned above. It should be noted that although in the present embodiment, the index creation-related request is defined as mentioned above based on the general index creation process, this is not limitative. By analyzing a request for index creation which is requested by an actually used search server, the analyzed request may be defined as the index creation-related request.

For example, let it be assumed that only search servers that do not perform full-text search, but perform only a search for a file name and attributes are connected to the network 401. In this case, the search servers make only a request for acquiring a list of folders (subfolders) and data files (hereinafter referred to as the "folder list"), and a request for acquiring data attributes. Therefore, it is possible to determine that requests for reading contents of data files are not from the search servers. That is, although the determination in the step S314 in the present embodiment is performed on requests from general search servers, this is not limitative, but it is possible to apply the present invention to requests for index creation from specific search servers.

Now, a description will be given of a determination process in the step S314.

For example, let it be assumed that the application 201 is an application for processing CIFS (Common Internet File System) which is a file sharing protocol.

Referring to FIG. 1, clients, such as the user PCs 404 and 405, perform various kinds of access, including an access for acquisition of a data file, to the image forming apparatus 402 using the CIFS protocol.

The protocol transmitted from the client includes a command. The command includes, by way of example, "SMB_COM_CREATE_NEW" for requesting creation of a new file, "SMB_COM_READ_ANDX" for requesting reading of a data file, and so forth.

The image forming apparatus 402 receives the protocol via the network interface 110, and the received protocol is passed to the application 201. In the application 201, the received protocol is analyzed to extract a command, and the extracted command is converted to a request to the data access processing section 200. For example, when the client requests the image forming apparatus 402 to create a data file, the application 201 performs the following processing:

The analysis of the protocol shows that the command "SMB_COM_CREATE_NEW" of the CIFS is contained, and hence the application 201 converts the command into the API for FileCreate appearing in FIG. 5.

Further, when acquiring attributes, such as a data file creation date, since a command "TRANS2_QUERY_FILE_INFORMATION" of the CIFS is contained, the application 201 converts the command into the API for GetAttribute. That is, the application 201 performs conversion of the command of an external communication protocol, i.e. the CIFS protocol in the present case, to a request which can be interpreted by the data access processing section 200.

Here, the index creation-related request does not request edit such as rewriting of contents of data files. Therefore, if the request is any of the "file deletion", "file writing", "folder creation", "folder deletion", "authority change", "owner change", "attribute setting", "name change", and "copy" requests shown in FIG. 5 it is possible to determine that the request is not an index creation-related request.

In short, if the request received in the step S301 is one of these requests, the logical data access section 206 judges that the request from the application 201 is not an index creation-related request. As a result, the answer to the question of the step S314 is negative (No), and the CPU 101 proceeds to the step S315. Inversely, if the request received in the step S301 is not any of these requests, it is impossible to determine with certainty that the request from the application 201 is not an index creation-related request, and there is a possibility that the request is an index creation-related request. In this case, the logical data access section 206 judges that the request from the application 201 is an index creation-related request, the answer to the question of the step S314 becomes affirmative (Yes), and the CPU 101 proceeds to the step S316 in FIG. 4C.

In the step S315, since it is judged in the step S314 that the request is not an index creation-related request, regarding that the access is made by user's operation, the CPU 101 sets, by the priority management section 204, the processing priority of the session in the session management table managed by the session management section 205 to "High", and then proceeds to the step S308. Thereafter, similarly to the above-mentioned case where the processing priority is "High", the steps S308, S309, and S326 are executed, followed by terminating the present process.

On the other hand, in the step S316 in FIG. 4C, the CPU 101 calculates, by the priority management section 205, a time elapsed after the response time at which the response was made to the preceding request to receipt of the current request (current time) to thereby determine whether or not the calculated elapsed time is within the predetermined time period. In doing this, the response time, at which the response was made to the preceding request of the session, for use in calculating the elapsed time by the priority management section 205 was recorded in the session management section 204, and hence the priority management section 205 acquires the response time associated with the present session from the session management section 204.

Then, if the calculated elapsed time is longer the predetermined time period, there is a possibility that the access has not been made by programmed automatic processing, but by user's operation, and hence the CPU 101 proceeds to a step S317. Further, if the calculated elapsed time is within the predetermined time period, there is a possibility that the access has been made by programmed automatic processing, so that the CPU 101 proceeds to a step S319.

In the step S317, the CPU 101 increments, by the priority management section 205, the variable t in the session management table managed by the session management section 204 by 1, and then the CPU 101 proceeds to a step S318.

In the step S318, the CPU 101 determines, by the priority management section 205, whether or not the value of the variable t is not less than a predetermined value. If the value of the variable t is not less than the predetermined value, i.e. if the number of times that the elapsed time calculated in the step S316 is longer than the predetermined time period is not less than a predetermined number, it is judged that the access is being made by user's operation. Therefore, if it is determined that the value of the variable t is not less than the predetermined value, the CPU 101 proceeds to the step S315.

In the step S315, the CPU 101 sets, by the priority management section 204, the processing priority of the session in the session management table managed by the session management section 205 to "High", and then proceeds to the step S308. Thereafter, similarly to the above-mentioned case where the processing priority is "High", the steps S308, S309, and S326 are executed, followed by terminating the present process.

On the other hand, if the value of the variable t is less than the predetermined value, although the elapsed time calculated in the step S316 indicates a possibility that the access is being made by user's operation, the number of times of the occurrence thereof is less than the predetermined number, and hence it is considered that it is not possible to determine with certainty that the access is been made by user's operation. Therefore, without causing the priority management section 205 to change the processing priority of the session, the CPU 101 proceeds to the step S308.

In the step S319, to which the CPU 101 proceeds when it is determined in the step S316 that the calculated elapsed time is within the predetermined time period, the CPU 101 increments, by the priority management section 205, the variable n in the session management table managed by the session management section 204 by 1, and then proceeds to a step S320.

In the step S320, the CPU 101 determines, by the priority management section 205, whether or not the value of the variable n is not less than a predetermined value. If it is determined that the value of the variable n is not less than the predetermined value, i.e. if the number of times that the elapsed time calculated in the step S316 is within the predetermined time period is not less than a predetermined number, it is determined that the access is being made by programmed automatic processing. Therefore, if it is determined that the value of the variable n is not less than the predetermined value, the CPU 101 proceeds to a step S321.

In the step S321, the CPU 101 sets, by the priority management section 205, the processing priority of the session in the session management table managed by the session management section 204 to "Low", and then proceeds to the step S322, wherein the CPU 101 executes the request only in a state where much load is not placed. The steps S322 et seq. are the same as those in the above-mentioned case where the processing priority is "Low" in the step S307.

On the other hand, if it is determined the value of the variable n is less than the predetermined value, although the elapsed time calculated in the step S316 indicates a possibility that the access is being made by programmed automatic processing, the number of times of occurrence thereof is less than the predetermined number, and hence it is considered that it is not possible to determine with certainty that the access is being made by the programmed automatic processing. Therefore, without causing the priority management section 205 to change the processing priority of the session, the CPU 101 proceeds to the step S308. The steps S308, S309, and S326 are the same as those in the above-mentioned case where the processing priority is "High".

It should be noted that although in the data access process in FIG. 4, whether or not the access has been made by the programmed automatic processing is determined based on both of the determination of the index creation request (S314) and the determination of the elapsed time between the preceding response and the current request (S316), the determination may be performed based on one of these determinations. Further, in the present embodiment, by recording the numbers of results of determination concerning the elapsed time between the preceding response and the current request using the variables t and n, whether the access is being made by programmed automatic processing or by user's operation is determined only when the variable t or the variable n is not less than the predetermined value. However, the processing priority may be determined by setting the predetermined values for the variables t and n to 0 or omitting the determinations using the variables t and n.

As described above, in the present embodiment, even when an access made by programmed automatic processing for index creation from an external apparatus and an access made by a normal manual operation of the user operating the console section 106 or the like are mixed, it is possible to detect the access made by programmed automatic processing for index creation. Further, by recording the number of times that the elapsed time between the preceding response and the current request is within the predetermined time period and the number of times that the elapsed time is longer than the predetermined time period, it is possible to prevent the processing priority from being changed, when the elapsed time becomes within the predetermined time period or longer than the same, only once.

With this configuration, even when an access for index creation from an external apparatus and an access by a normal manual operation of the user operating the console section 106 or the like are mixed, it is possible to give priority to processing of the access made by a normal manual operation of the user. As a result, in a case where the image forming apparatus 402 has a file server function, even when load of index creation is placed on the image forming apparatus 402, it is possible to give priority to processing of the copy function and print function which are the original functions of the image forming apparatus 402.

It should be noted that although in the present embodiment, the image forming apparatus is described as an example of the information processing apparatus, this is not limitative, but it is possible to apply the present embodiment to information processing apparatuses having a general file server function including PCs.

Next, a description will be given of an image forming apparatus as an information processing apparatus according to a second embodiment of the present invention with reference to FIGS. 7 to 9C. It should be noted that the same component parts and elements as those of the first embodiment are denoted by the same reference numerals.

In the above-described first embodiment, it is determined only whether or not the request from the application 201 in the session at the present time point is an index creation-related request (step S314 in FIG. 4). In doing this, even when the request from the application 201 has been made with an access pattern different from the pattern of access for index creation from the search server 403, a plurality of processes are required to be executed before determining whether or not the access has been made by programmed automatic processing.

In the present embodiment, if the pattern of access for index creation from a server has already been identified, if an access is made with a pattern different from the identified pattern, it is immediately judged that the access has been made by user's operation, and sets the processing priority accordingly.

FIG. 7 shows an example of the session management table used in the present embodiment. The session management table shown in FIG. 7 is formed by adding an item of "preceding request" to the session management table in the first embodiment (FIG. 6).

In FIG. 7, in the case of a session having a session ID of 1, the preceding request is "GetList(/share/folder)", which indicates that a request for acquiring the folder list of a folder named /share/folder has been received. In the case of a session having a session ID of 5, the preceding request is "WriteData (/user/yamada/abc/foo.txt)", which indicates that a request for writing a data file named /user/yamada/abc/foo.txt has been received.

Further, in the case of a session having a session ID iof 8, the preceding request is "ReadData(/share/folder/xyz/pqr-.doc)[ERROR]". This indicates that although a request for reading data named /share/folder/xyz/pqr.doc has been received, it was unsuccessful due to an error.

Although not shown, other requests include "CreateFolder" for folder creation, "GetAttr" for attribute acquisition, "SetAttr" for attribute setting, "Delete" for object deletion, and so on. Further, an object folder and a data file path are specified for each request, and if an error occurs, "[ERROR]" is added.

Figure 8:
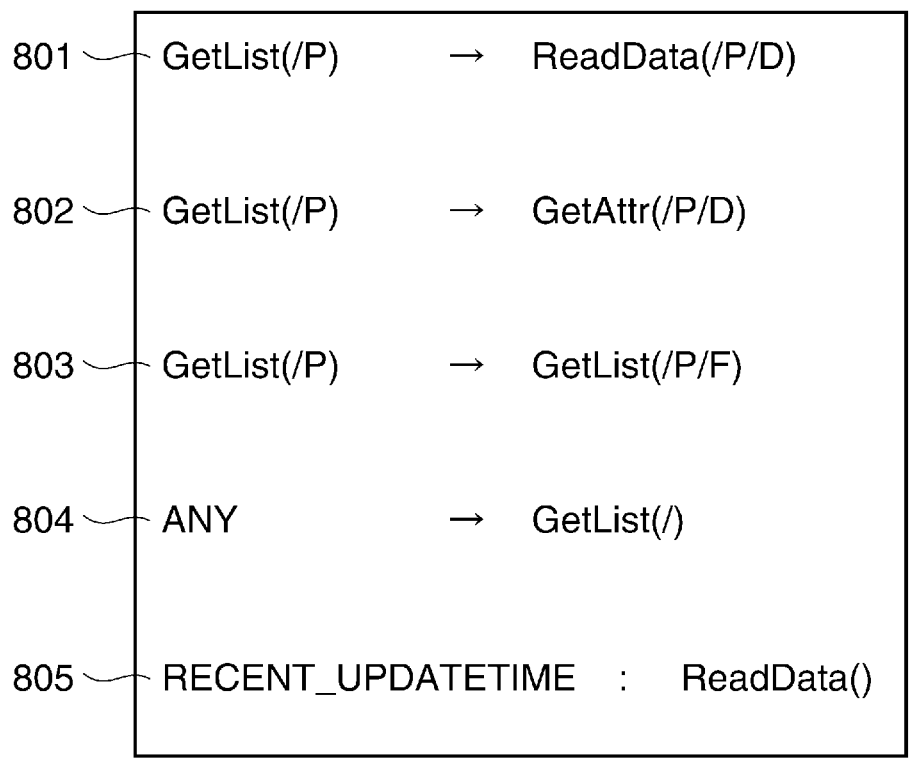
[FIG. 8] A diagram showing an example of a pattern list used in the image forming apparatus.

FIG. 8 is a diagram showing an example of a pattern list of patterns of access made by programmed automatic processing for index creation and the like.

Accesses the patterns of which do not match any patterns of the pattern list shown in FIG. 8 are judged to be made by user's operation. It should be noted that an access the pattern of which matches one of the pattern list is not immediately judged as one made by programmed automatic processing because even the access by user's operation is sometimes made with the same pattern as that of an access by programmed automatic processing. When a pattern of an access matches any of the pattern list, the elapsed time between the response to the preceding request and the current request associated with the access is determined, as described in the first embodiment, whereby it is determined whether or not the access has been made by programmed automatic processing.

The pattern list is managed by the priority management section 205. For example, in the pattern list in FIG. 8, an arrow (→) indicates a pattern of a combination of the preceding request and the current request, and a colon (:) indicates a condition pattern.

In combination patterns 801 to 804, the preceding request and the current request are illustrated on the left side and right side of each arrow (→) as viewed in FIG. 8, respectively. The combination pattern 801 shows that the preceding request is "GetList" for acquiring a folder list, while the current request is "ReadData" for data reading and at the same time the data to be read is a data file (/P/D) stored in a folder (/P) from which the folder list has been acquired by GetList. In the table, /P represents a path of the folder from which the folder list is to be acquired by GetList, and D represents the data file.

That is, /P/D represents the data file immediately under the path of the folder from which the folder list was acquired by GetList. It should be noted that a data file not immediately under a folder path but stored in a certain folder below the folder path is represented by ../D. Although not shown in FIG. 8, if a data file is represented by /P/../D, this represents data which exists below the path of the folder from a folder list was acquired by GetList.

Similarly, the combination pattern 802 shows that the preceding request is "GetList" for acquiring a folder list, while the current request is "GetAttr" for attribute acquisition and at the same time the data file of which attributes are to be acquired is a data file (/P/D) immediately under the path of the folder (/P) from which the folder list was acquired by GetList. The combination pattern 803 shows that the preceding request is "GetList" for folder list acquisition, while the current request is "GetList" for folder list acquisition and at the same time the folder from which a folder list is to be acquired is a folder (/P/F) immediately under the path of the folder (/P) from which the folder list was acquired by GetList. Here, F represents the folder.

The combination pattern 804 shows that the preceding request has an entry of "Any", which indicates that the preceding request may be any request, while the current request is "GetList" for folder list acquisition and at the same time the folder from which a folder list is to be acquired is a root folder (/).

Further, in a condition pattern 805, a condition and a request to which the condition is applied are illustrated on the left side and right side of a colon, respectively. More specifically, the condition pattern 805 shows that the condition is "RECENT UPDATETIME", which indicates currently updated data files. The request to which this condition is applied is "ReadData". Therefore, this is a pattern of a request for reading currently updated data files. Here, which range of time the term "current" covers may be defined in advance or may be dynamically determined based on the date of update of a data file to be accessed. That is, this pattern is a pattern of a request for reading only data files which have been updated after a certain date and time.

The pattern list may be stored in a predetermined storage area of the image forming apparatus 402 in advance, and an administrator of the image forming apparatus 402 may define the pattern by analyzing accesses for index creation from a server. Further, although the pattern list in the present embodiment contains a combination of two requests, i.e. the preceding request and the current request, the pattern list may contain a combination of two or more requests, or may be a combination of requests at desired time points.

Figure 9A:
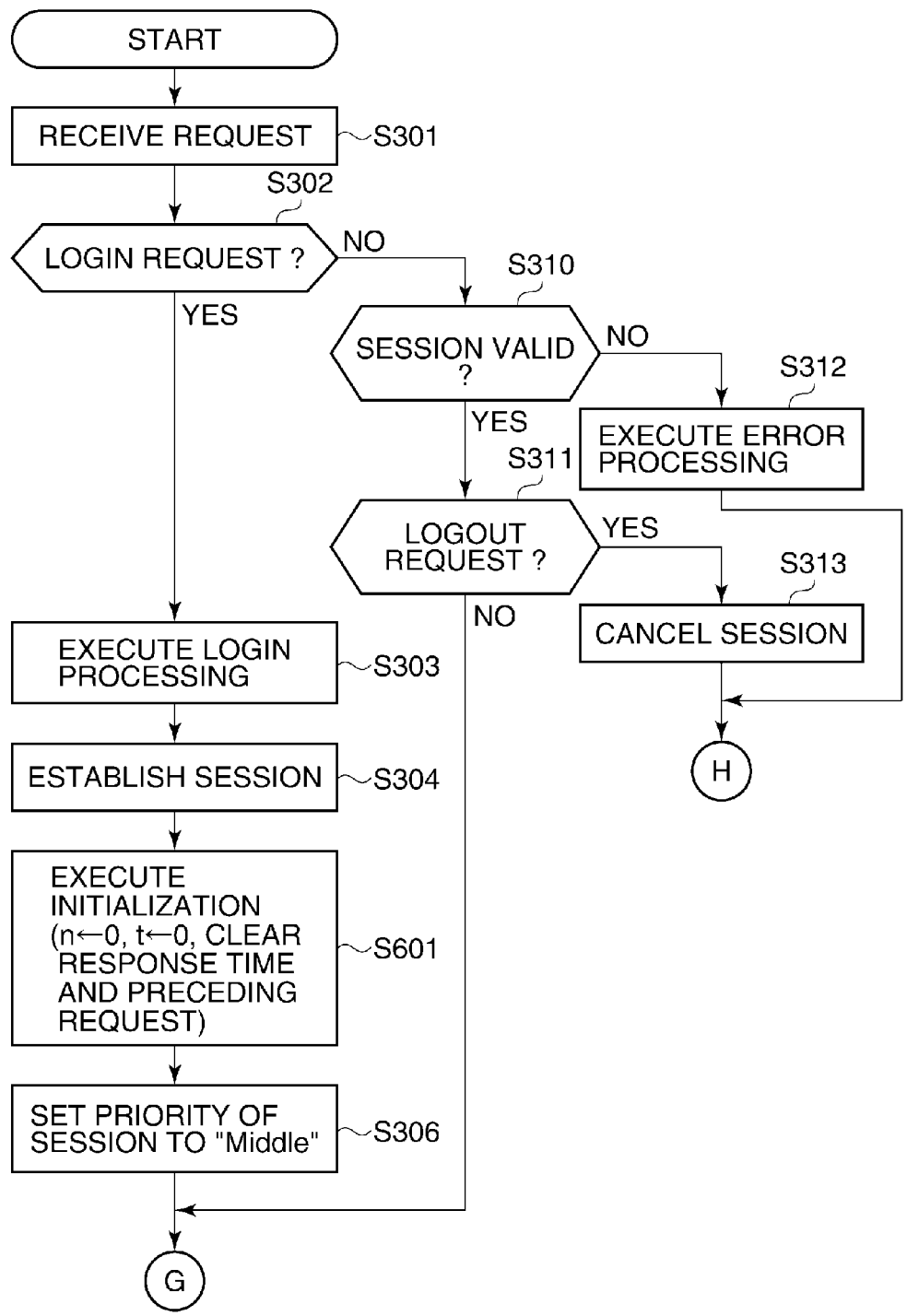
[FIG. 9A] A flowchart of a data access process including processing priority setting, which is executed by the data access processing section of the image forming apparatus.
Figure 9B:
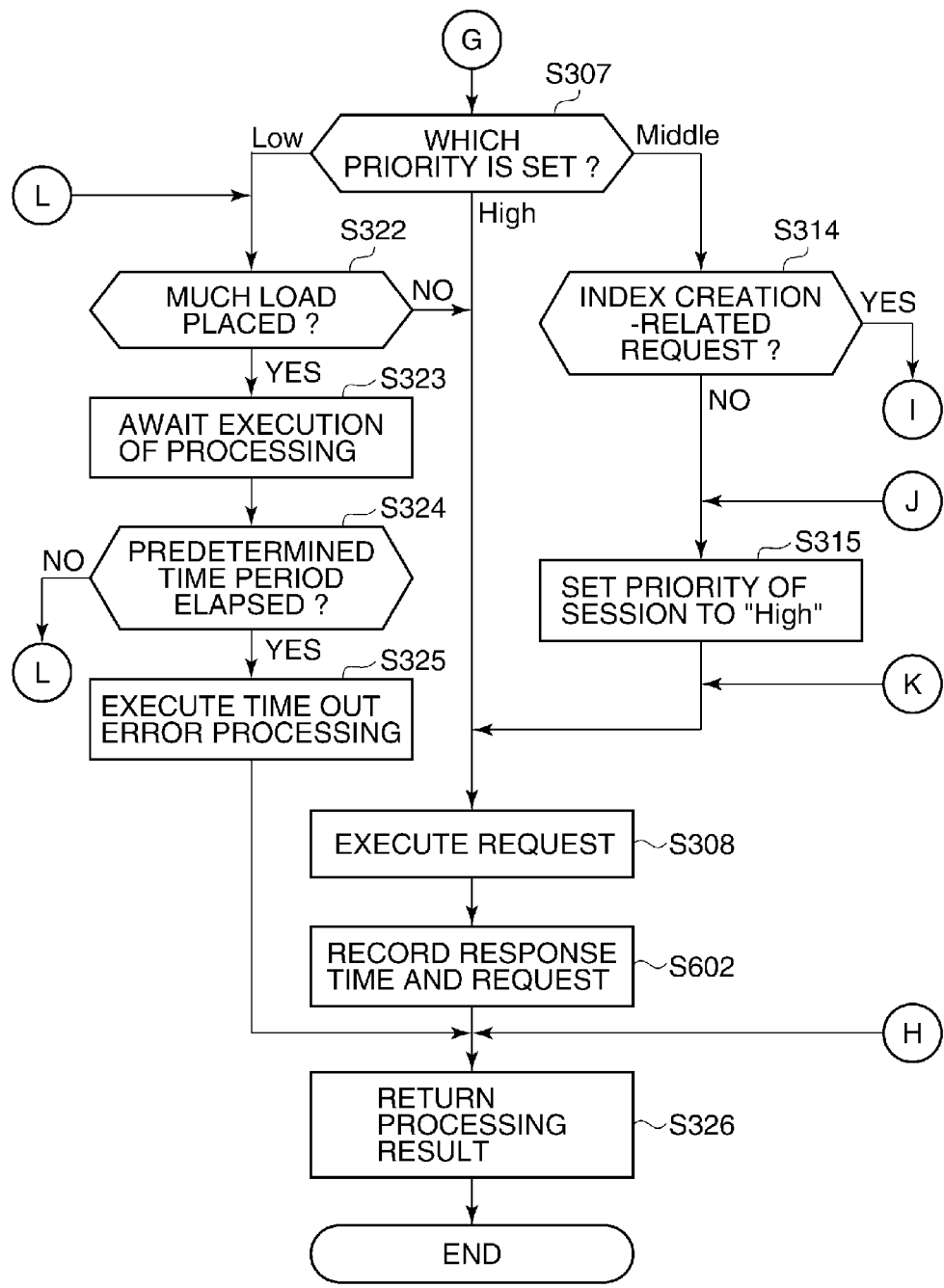
[FIG. 9B] A continuation of FIG. 9A.
Figure 9C:
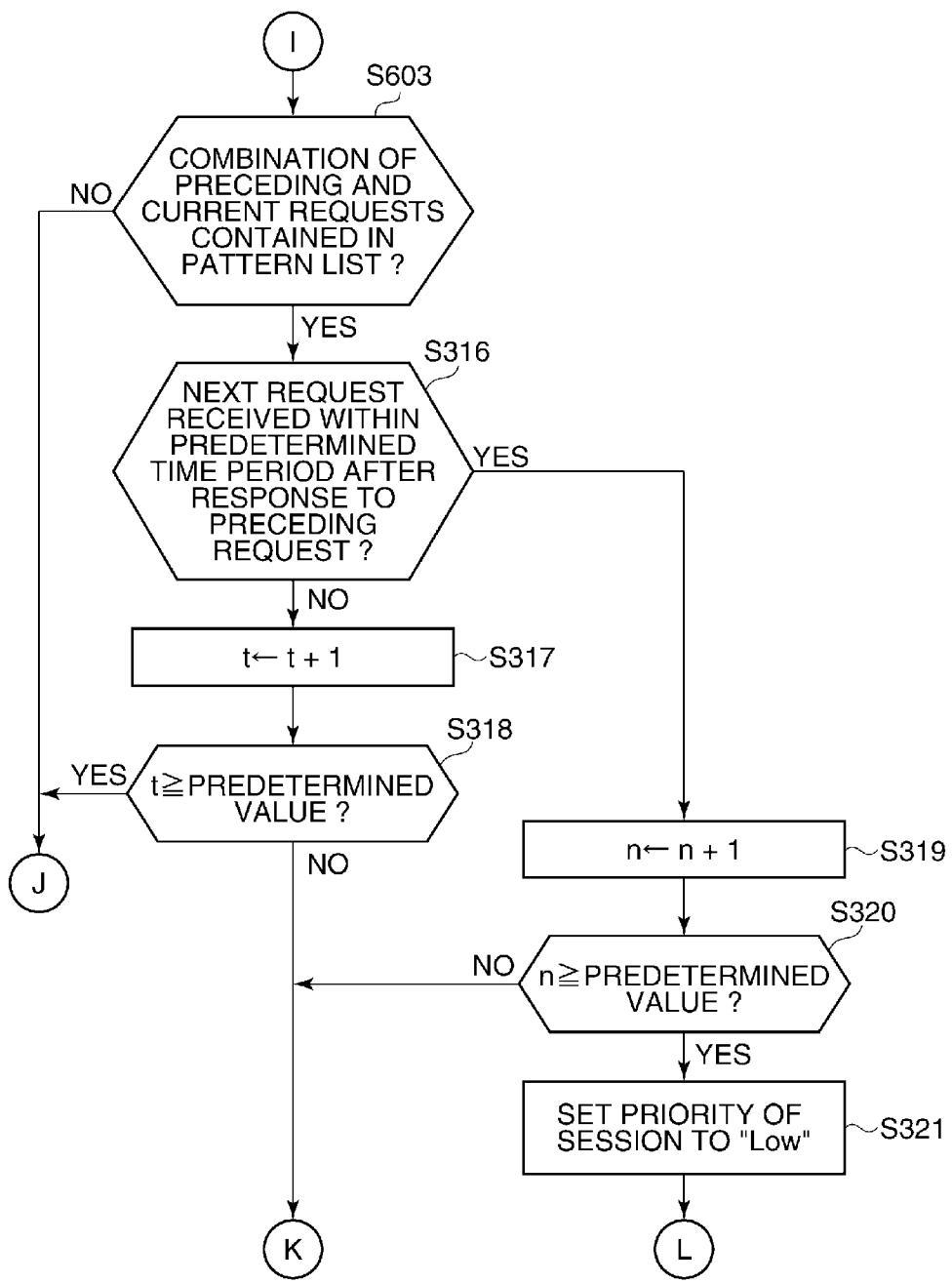
[FIG. 9C] A continuation of FIG. 9B.

Next, a description will be given of a data access process including processing priority setting, which is executed by the data access processing section 200 of the image forming apparatus 402 of the present embodiment, with reference to FIGS. 9A to 9C. The data access process in FIGS. 9A to 9C is executed by the CPU 101 loading a data access-processing program stored in the HDD 104 or the ROM 103 of the image forming apparatus 402 into the RAM 102. It should be noted that in FIGS. 9A to 9C, the same steps as those of the first embodiment (FIGS. 4A to 4C) are denoted by the same step numbers, and description thereof is omitted.

In the present embodiment, the session management table is configured to have a preceding request added thereto, and hence in a step S601 in FIG. 9A which replaces the step S305 in FIG. 4A, the CPU 101 sets, by the session management section 204, each of the variables n and t to an initial value of 0 and clears the response time and the preceding request, and then proceeds to the step S306.

In a step S602 in FIG. 9B which replaces the step S309 in FIG. 4B, similarly, due to the session management table being configured to have preceding requests added thereto, the CPU 101 records, by the session management section 204, the request from the application 201 and a response time to the request, and then proceeds to the step S326.

A step S603 in FIG. 9C which replaces the step S316 in FIG. 4C is executed if the priority management section 205 determines in the step S307 that the processing priority is "Middle" and the logical data access section 206 determines in the step S314 that the request is an index creation-related request.

In the step S603, the CPU 101 determines, by the priority management section 205, whether or not an access pattern indicated by the combination of the preceding request and the current request is contained in the pattern list shown in FIG. 8. More specifically, the priority management section 205 acquires the preceding request from the session management table managed by the session management section 204, and determines whether or not an access pattern indicated by the acquired combination of the preceding request and the current request matches any of the patterns in the pattern list managed by the priority management section 205.

Then, if it is determined that the access pattern indicated by the acquired combination of the preceding request and the current request matches any of the patterns in the pattern list, there is a possibility of the access having been made by programmed automatic processing, so that the CPU 101 proceeds to the step S316. Further, if the access pattern indicated by the acquired combination of the preceding request and the current request does not match any of the patterns in the pattern list, it is judged that the access has not been made by programmed automatic processing, i.e. the access has been made by user's operation, so that the CPU 101 proceeds to the step S315, wherein the processing priority of the session is changed.

As described above, in the present embodiment, if the pattern of an access to the image forming apparatus 402 is different from any of patterns which are identified as those of accesses for index creation from the search server or the like, it can be immediately judged that the access has been made by user's operation without performing predetermined processing to thereby set the present session to a high processing priority. The other configuration and advantageous effects are the same as those provided by the above-described first embodiment.

Next, a description will be given of an image forming apparatus as an information processing apparatus according to a third embodiment of the present invention with reference to FIGS. 10 to 11C. It should be noted that the same component parts and elements as those of the first embodiment are denoted by the same reference numerals.

In the first embodiment, when the request from the application 201 in the session at the present time point is an index creation-related request, it is determined whether or not the elapsed time from the preceding request is within the predetermined time period (step S316).

On the other hand, the search server 403 or the like that performs index creation executes a different processing depending on information acquired as a response to the request. For example, in the case of acquisition of attributes of data files, the search server 403 only acquires information on the data files, such as names, creation dates, the dates of update, and owner of the data files, into a database of the server. However, in the case of acquiring contents of data files, the search server 403 analyzes the contents of each acquired data file using morphological analysis or the N-Gram method for full text search, thereby performing index creation. As a result, it takes long processing time depending on the amount of contents of the acquired data file, and hence the time interval until the next request can become longer.

Further, in the case of folder list acquisition, the time interval until the next request varies with the number of folders (subfolders) and data files in the acquired folder list. For example, if only one data file exists in the folder, it is possible to acquire the data file immediately after the folder list is acquired. However, if the folder contains data files and folders (subfolders) amounting to a number of ten thousand, it is required to manage the acquired list of ten thousand items, and then carry out acquisition of data files and further acquisition of a folder list of a subfolder. Therefore, a time interval until the next request varies with the number of data files and folders (subfolders) in the acquired folder list.

Further, a time required to make a request from the search server 403 or the like that performs index creation and a time required to respond to the request also depend on the traffic amount of the network. In a state where the traffic amount of the network is large and hence the network is crowded, even when the search server 403 or the like sends a request immediately after receiving the response to the preceding request, it takes a long time for the request to reach the image forming apparatus 402.

To solve this problem, in the present embodiment, a time period with reference to which it is determined whether or not an access has been made by programmed automatic processing is adjusted according to the result of a request, and further, by checking the traffic status of a network, the time period is adjusted with reference to which it is determined that the access has been made by programmed automatic processing.

FIG. 10 is a diagram showing an example of a session management table used in the present embodiment. The session management table shown in FIG. 10 is formed by adding items of "preceding request" and "response size" to the session management table (FIG. 6) of the first embodiment.

In FIG. 10, in the session having a session ID of 1, the preceding request is "GetList(/share/folder)", which indicates that a request for acquiring the folder list of a folder named /share/folder has been received, as mentioned above, and the number of folders (subfolders) and data files in the folder list acquired by GetList is set forth as 18 at the response size. In a session having a session ID of 5, the preceding request is "WriteData(/user/yamada/abc/foo.txt)", which indicates a request for writing a data file named /user/yamada/abc/foo.txt. This session shows a response size of 200 byte, which indicates that a data file having a data size of 200 bytes has been returned.

Further, in a session having a session ID of 8, the preceding request is "ReadData(/share/folder/xyz/pqr.doc)[ERROR]", and the response size is 0 because the request is not successful due to an error. Although not shown, as in the case of the "CreateFolder" request for folder creation, when it is not necessary to return a response size, the response size is set to 0.

Further, in the case of reading a data file, the request therefor from the application 201 is sometimes made by dividing the same into several requests. For example, a data file having a data size of 500 bytes is sometimes read out in five times, each time by 100 bytes. In this case, a request for opening data, five requests for reading data, and a request for closing data are made in the mentioned order, and in the column of the preceding request in the session management table, there are set forth an item of start of reading data (OpenData) and an item of completion of reading data (CloseData).

A description will be given by taking an example of a case of reading out a data file named /foo/xxx.txt and having a data size of 300 bytes, in three times, each time by 100 bytes. In this case, the application 201 issues requests of OpenData(/foo/xxx.txt), ReadData (/foo/xxx.txt) [response size=100 bytes], ReadData (/foo/xxx.txt) [response size=100 bytes], ReadData (/foo/xxx.txt) [response size=100 bytes], and CloseData (/foo/xxx.txt), in the mentioned order.

Figure 11A:
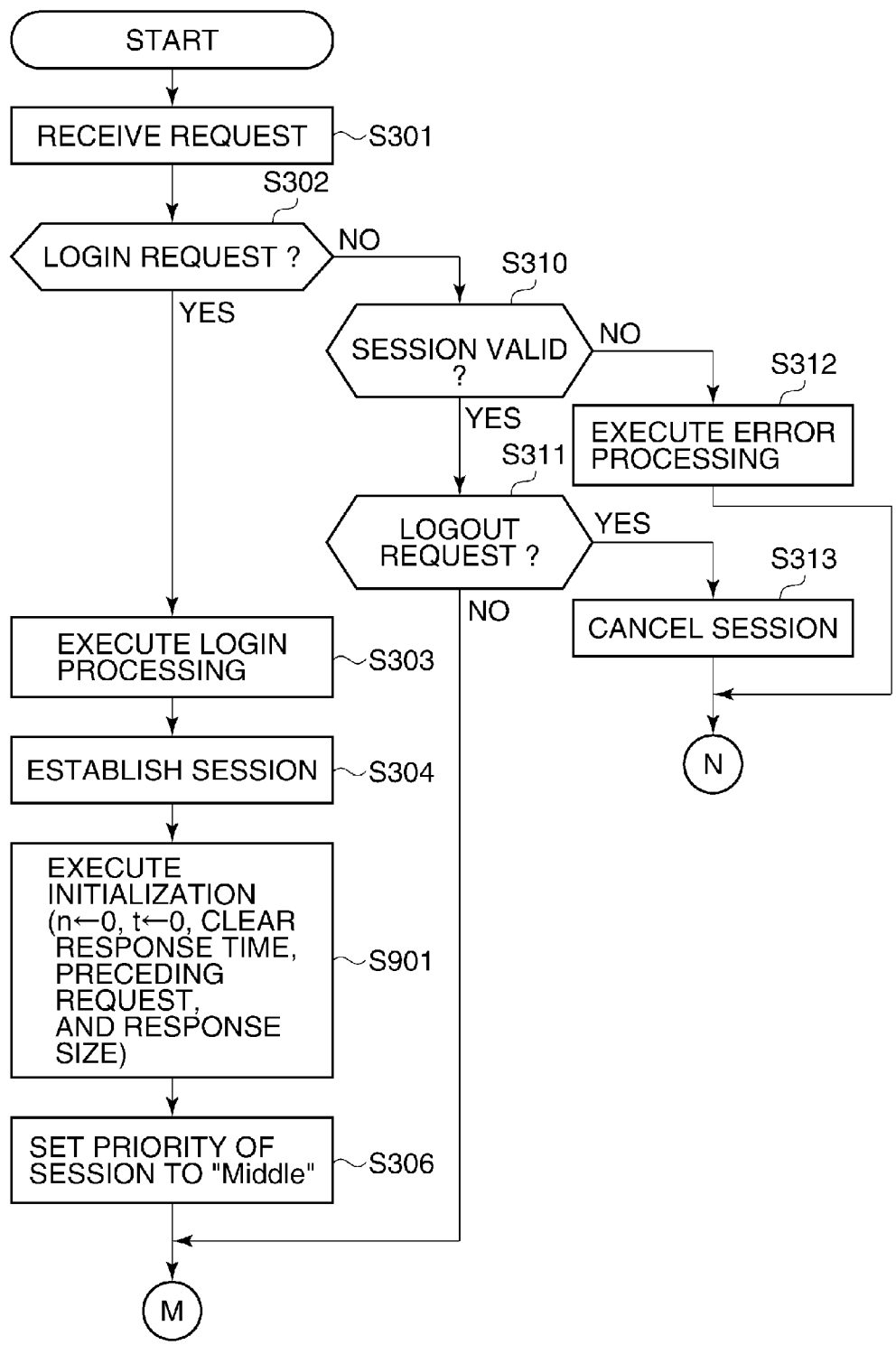
[FIG. 11A] A flowchart of a data access process including processing priority setting, which is executed by the data access processing section of the image forming apparatus.
Figure 11B:
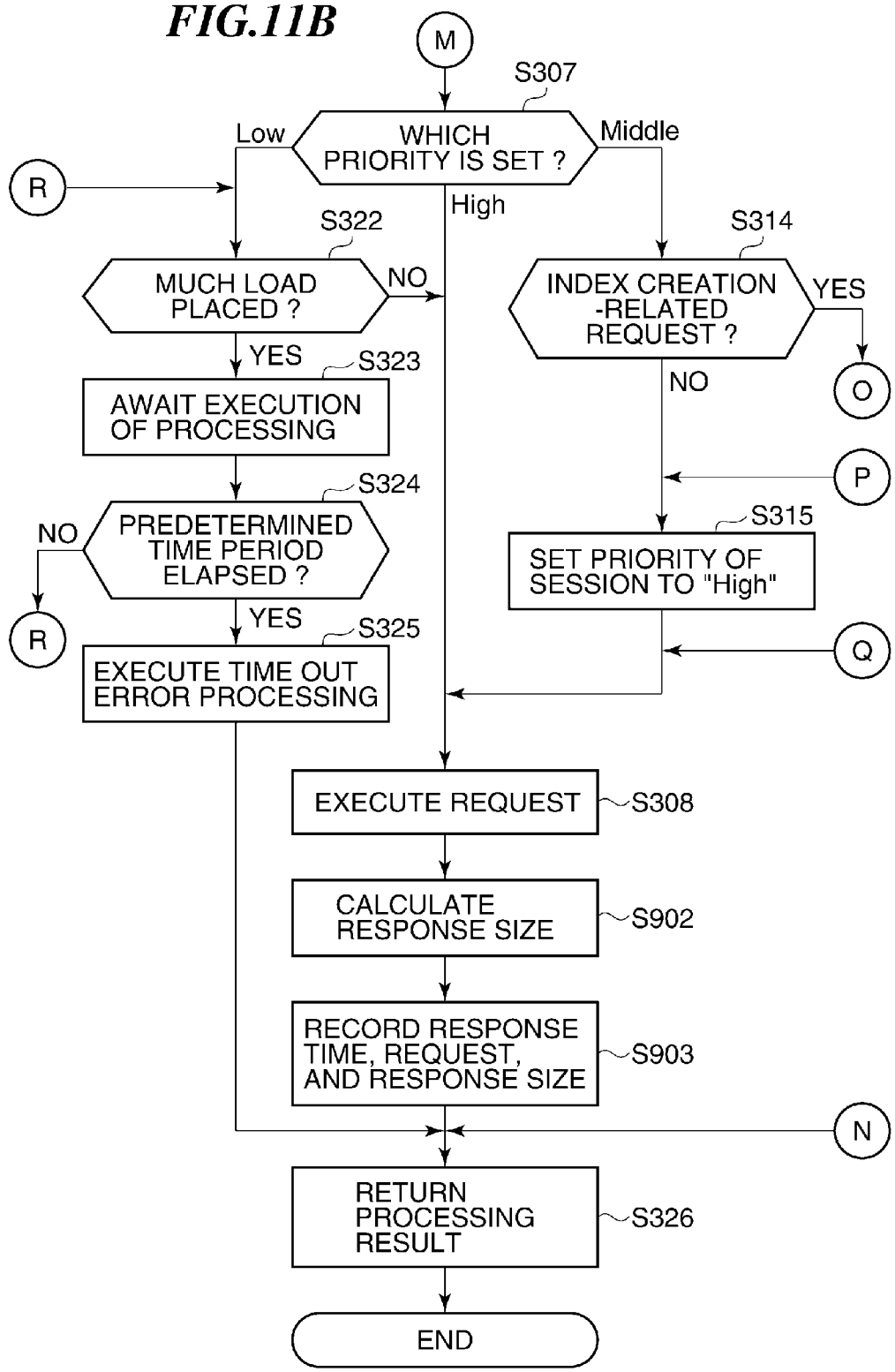
[FIG. 11B] A continuation of FIG. 11A.

Next, a description will be given of a data access process including processing priority setting, which is executed by the data access processing section 200 of the image forming apparatus 402 of the present embodiment, with reference to FIGS. 11A to 11C. The data access process in FIGS. 11A to 11C is executed by the CPU 101 loading a data access-processing program stored in the HDD 104 or the ROM 103 of the image forming apparatus 402 into the RAM 102. It should be noted that in FIGS. 11A to 11C, the same steps as those of the first embodiment (FIGS. 4A to 4C) are denoted by the same step numbers, and description thereof is omitted.

In the present embodiment, the session management table is configured to have a preceding request and a response size added thereto, and hence in a step S901 in FIG. 11A which replaces the step S305 in FIG. 4A, the CPU 101 sets, by the session management section 204, each of the variables n and t to an initial value of 0 and clear the response time, the preceding request, and the response size, and then proceeds to the step S306.

In a step S902 following the step S308 in FIG. 11B, described with reference to FIG. 4B, the CPU 101 determines, by the logical data access section 206, the size of a response to the request (response size), and proceeds to a step S903 in FIG. 11B which replaces the step S309 in FIG. 4B. If the response is made, for example, to a request for folder list acquisition, the response size is indicated by the number of folders (subfolders) and data files in the acquired folder list, while if the response is made to a request for data reading, the response size is indicated by the size of read data. Here, as mentioned in the description of the session management table in FIG. 10, a data file is sometimes read by dividing the same into parts. When the preceding request in the session management table is ReadData, and at the same time the current request is also ReadData, the priority management section 205 causes the sum of the response size of the preceding request and the response size of the current request to be set forth as the response size in the session management table. That is, when the reading of the data is completed, a total response size of the data reading request is determined.

In the step S903 in FIG. 11B, the CPU 101 records, by the session management section 204, the request from the application 201, the response time to the request, and the response size calculated in the step S902 into the session management table, and then proceeds to the step S326.

A step S904 in FIG. 11C is executed if the priority management section 205 judges in the step S314 in FIG. 11B, already described hereinabove with reference to FIG. 4B, that the processing priority is "Middle".

In the step S904 in FIG. 11C, based on the preceding request type and response size acquired from the session management section 204, the CPU 101 adjusts, by the priority management section 205, the predetermined time period with reference to which it is determined in the step S316 whether or not the access has been made by programmed automatic processing, and then proceeds to a step S905.

For example, let it be assumed that the preceding request is for folder list acquisition and the number of folders (subfolders) and data files in the acquired folder list is equal to "m". If the predetermined time period with reference to which it is determined in the step S316 whether or not the access has been made by programmed automatic processing is "s" seconds, for example, "s+m/1000" obtained by adding "m/1000" to "s" is an adjusted predetermined time period.

Further, if the preceding request is for data reading, as mentioned in the description of the step S902 made with reference to in FIGS. 10 and 11B, the data file is read by dividing the same into parts, and hence the adjustment in the step S904 is made when the reading of the data file is completed.

That is, assuming that the preceding request is a final one of divided requests for data reading, and the total size of the read data is "x" bytes, for example, "s+x/100" obtained by adding "x/100" to "s" is an adjusted predetermined time period with reference to which it is determined whether or not the access has been made by programmed automatic processing. It should be noted that although in the present embodiment, the adjustment of the predetermined time period is performed when the reading of data is completed, the adjustment may be performed each time data is read out. This processing for adjusting the predetermined time period in the step S904 in FIG. 11C corresponds to an example of operation of a first adjusting unit of the present invention.

In the step S905 in FIG. 11C, the CPU 101 checks, by the priority management section 205, the load status based on the traffic of the network, and similarly to the step S904, adjust the predetermined time period with reference to which it is determined whether or not the access has been made by programmed automatic processing, and then proceeds to the step S316.

For example, the priority management section 205 transmits a packet to an apparatus on the LAN via the network interface 110 to check the load status of the network. As a result of this check, if it is determined that the load on the network is high, the priority management section 205 adds a value corresponding to the load on the network to the predetermined time period with reference to which it is determined whether or not the access has been made by programmed automatic processing. This processing for adjusting the predetermined time period in the step S905 corresponds to an example of operation of a second adjusting unit of the present invention.

In the step S316, it is determined whether the time elapsed after the response of the preceding request is within the predetermined time period adjusted in the steps S904 and S905. The subsequent steps are the same as those in the above-described first embodiment.

As described above, in the present embodiment, the predetermined time period with reference to which it is determined whether or not the access has been made by programmed automatic processing is adjusted according to the response (processing result) of the request and the traffic status of the network, whereby it is possible to more accurately determine whether or not the access has been made by programmed automatic processing. It should be noted that although in the present embodiment, the predetermined time period with reference to which it is determined whether or not the access has been made by programmed automatic processing is adjusted according to two factors, i.e. the response (processing result) of the request and the traffic status of the network, the predetermined time period may be adjusted according to one of the two factors. The other configuration and advantageous effects are the same as those of the first embodiment.

Next, a description will be given of an image forming apparatus as an information processing apparatus according to a fourth embodiment of the present invention with reference to FIG. 12. It should be noted that the same component parts and elements as those of the first embodiment are denoted by the same reference numerals.

When the image forming apparatus 402 is accessed not by an external apparatus via the network, but by the user who is operating the console section 106 of the image forming apparatus 402, it is considered that the user is using the copy function or the like, which is the original function of the image forming apparatus 402. In this case, it is preferable, by regarding that load on the image forming apparatus 402 is high, not to execute processing having a low processing priority but to allocate the processing capability of the CPU 101 to the user using the console section 106.

Further, in the image forming apparatus 402, what processing was executed and when it was executed are recorded in a log. For a time zone in which a high load is expected from this log information, the load on the image forming apparatus 402 may be set to be high in advance, whereby it is possible to block accesses which can be regarded as index creation-related ones from the search server 403 or the like and are low in processing priority.

Figure 12:
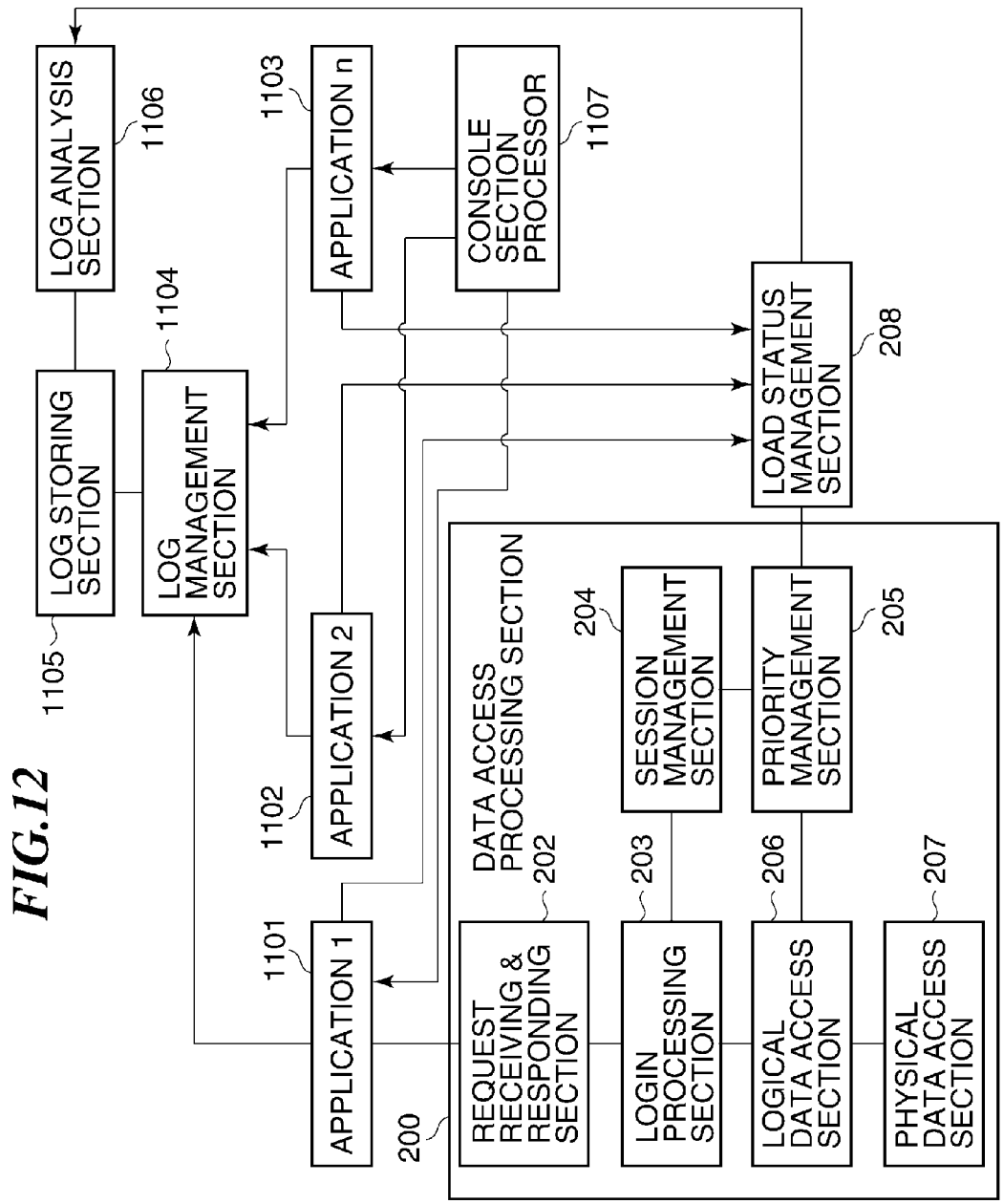
[FIG. 12] A functional block diagram useful in explaining data access processing in an image forming apparatus as an information processing apparatus according to a fourth embodiment of the present invention.

FIG. 12 is a functional block diagram useful in explaining data access processing executed by the image forming apparatus 402 of the present embodiment. It should be noted that the same component parts and elements as those of FIG. 3 are denoted by the same reference numerals, and description thereof is omitted.

As shown in FIG. 12, in the present embodiment, a plurality of applications 1101 to 1103 exist, and out of these applications 1101 to 1103, only application 1101 uses the data access processing section 200.

A console section processor 1107 notifies the applications 1101 to 1103 of an event that the console section 106 is operated by the user or the like, via the console section interface 105. When the applications 1101 to 1103 detect that the console section 106 is being used via the console section processor 1107, the applications 1101 to 1103 notify the load status management section 208 of the result of detection.

Further, when the applications 1101 to 1103 detect the termination of the use of the console section 106, the applications 1101 to 1103 notify the load status management section 208 of the termination of the use of the console section 106. The determination as to whether or not the use of the console section 106 is terminated can be determined, e.g. when login authentication is required when using the image forming apparatus 402, by regarding the time of logout of the user as the time of termination of the use of the console section 106. Alternatively or in addition, when the console section 106 is not used for a predetermined time period, it may be determined that the use of the console section 106 is terminated.

If the load status management section 208 has been notified that the operation section 106 is being used, when the priority management section 205 inquires about the load status in the step S322 in FIG. 4B, the load status management section 208 returns a response that much load is placed on the image forming apparatus 402.

Although in the present embodiment, the description has been given of the case where the response that much load is placed on the image forming apparatus 402 is returned when it is judged that the console section 106 is being operated, this is not limitative. For example, it the above-mentioned response may be returned when it is judged that the scanner 108 is being operated via the device interface 107, or when a human-sensing sensor, not shown, or the like detects that a man is in the vicinity of the image forming apparatus.

When the applications 1101 to 1103 perform processing, they each notify a log management section 1104 of a date and time when the processing was executed and details of the processing. The log management section 1104 records the contents of the notification into a log in a log storing section 1105 as usage log information. The log records pieces of information each on what processing was executed and when it was executed.

A log analysis section 1106 analyzes the log stored in the log storing section 1105 to determine in what time zone much load is placed on the image forming apparatus 402. Through the analysis, the log analysis section 1106 determines e.g. that a lot of log events are recorded between 9:00 and 10:00 and hence the load is high, that less log events are recorded between 12:00 and 13:00 and hence the load is low, and so on. The log analysis section 1106 may analyze not only load depending on the time zone, but also load varying with the day of the month or the day of the week.

In the step S322 in FIG. 4B, when queried about the load status by the priority management section 205, the load status management section 208 not only determines the load status but also queries the log analysis section 1106 about whether or not it is predicted that the load becomes high at the present time or shortly before or after the present time. The log analysis section 1106 predicts the load status based on the result of the analysis of the log, and returns the prediction to the load status management section 208. If it is predicted that the load becomes high even though not much load is placed at present, the load status management section 208 returns a response that the load is high to the priority management section 205.

As described above, in the present embodiment, when it is clear that the user is using the image forming apparatus 402, that is, e.g. when the user is operating the console section 106, it is possible to block processing which is low in priority, such as an index creation-related access from the search server 403. Further, the load is predicted by storing and analyzing the log of operations of the console section 106, and when it is time at which the load is predicted to be high, the processing low in priority, such as index creation-related access from the search server 403, can be blocked. The other configuration and advantageous effects are the same as those of the first embodiment.

Next, a description will be given of an image forming apparatus as an information processing apparatus according to a fifth embodiment of the present invention, with reference to FIGS. 13 and 14. It should be noted that the same component parts and elements as those of the first embodiment are denoted by the same reference numerals.

In the first embodiment, it is assumed that an access from the search server 403 that performs index creation is continuously performed in a state where it has logged in the data access processing section 200. That is, when the search server 403 once logs in the data access processing section 200, the search server 403 accesses the image forming apparatus 402 without logging out until the index creation is terminated. However, depending on the search server, there is a possibility that login and logout are repeated for each one processing or each several processings.

In this case, in the session management in the first embodiment, the information managed in the session management table is abandoned at the time of logout, and hence thereafter it becomes impossible to determine whether or not the access of this session has been made by programmed automatic processing. To eliminate this inconvenience, in the present embodiment, a data access process is performed by a virtual session.

FIG. 13 is a diagram showing an example of a session management table used in the present embodiment. This session management table is formed by adding items of "address" and "logout" to the session management table in FIG. 6. However, the session management table of FIG. 13 manages virtual sessions, and a session having a session ID of 1 has an IP address of "192.168.3.42", which indicates that apparatus having this address has accessed. Further, "No" is set forth at the column of logout, which indicates that a logout request has not been sent.

A session having a session ID of 5 has been started by an access from an apparatus having an IP address of "192.169.2.186", and a session having a session ID of 8 has been started by an access from an apparatus having an IP address of "192.168.74.93". Thus, by recording the IP addresses of apparatuses which have accessed, accesses from the same apparatus are regarded as ones for a virtual session. It should be noted that information recorded in the session management table is not limited to addresses, but apparatuses may be identified by any other information.

Further, in the session having the session ID of 5, "Yes" is set forth at the column of logout, which indicates that a logout request has been made, and the session has been logged out. The session management table records whether or not each session has been logged out and the session having logged out is caused to remain recorded therein. Further, although in the above-described first embodiment, response time is not recorded for each logout request, in the present embodiment, the response time is also recorded for the logout request in the session management table. Then, the session management section 204 checks the session management table at predetermined time intervals, for sessions having an entry of "Yes" at the column of logout, and if a predetermined time period has elapsed after the response time of the logout request of any of the sessions, the session is deleted from the session management table. This makes it possible to prevent useless information from remaining in the session management table after logout.

Figure 14A:
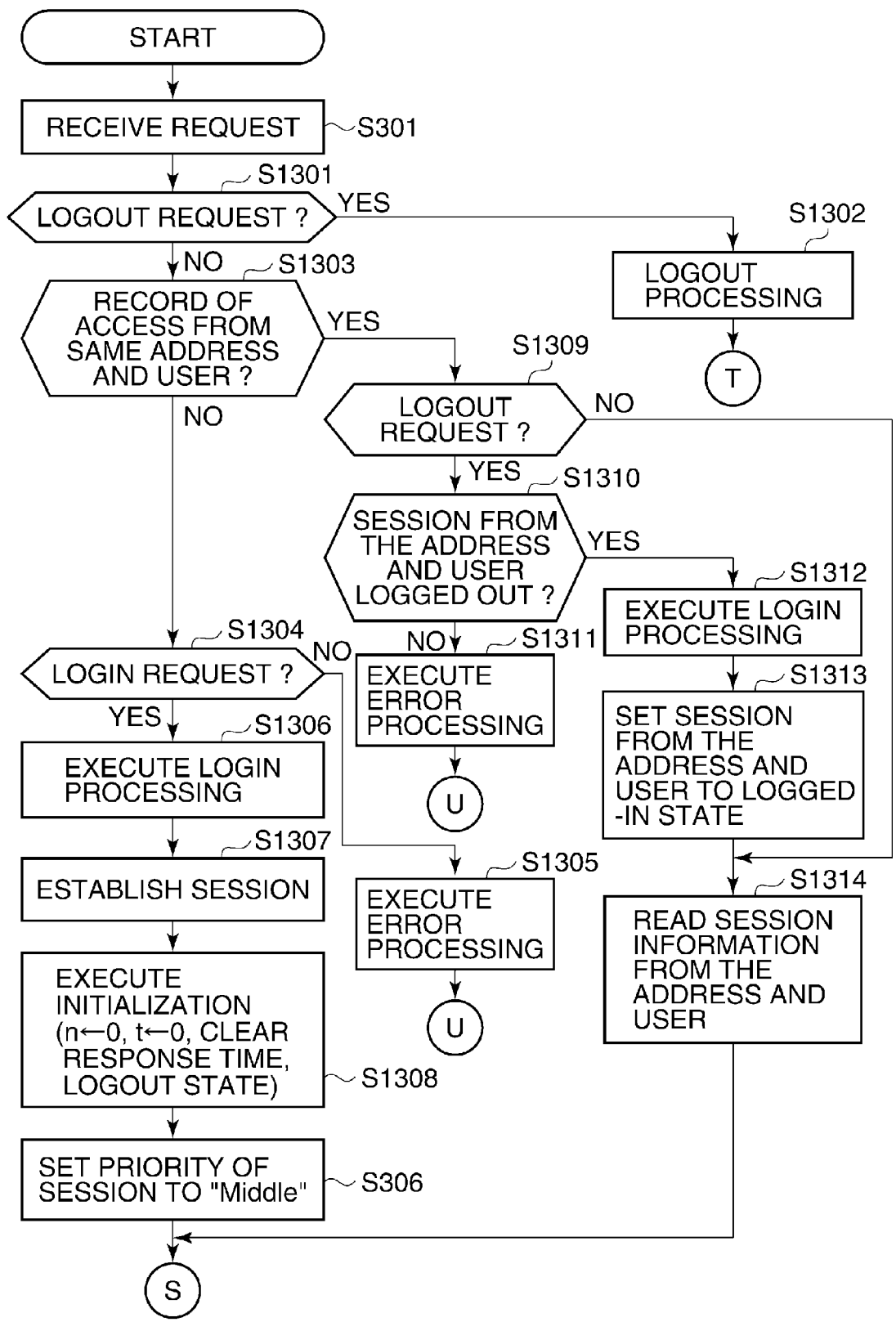
[FIG. 14A] A flowchart of a data access process including processing priority setting, which is executed by the data access processing section of the image forming apparatus.
Figure 14B:
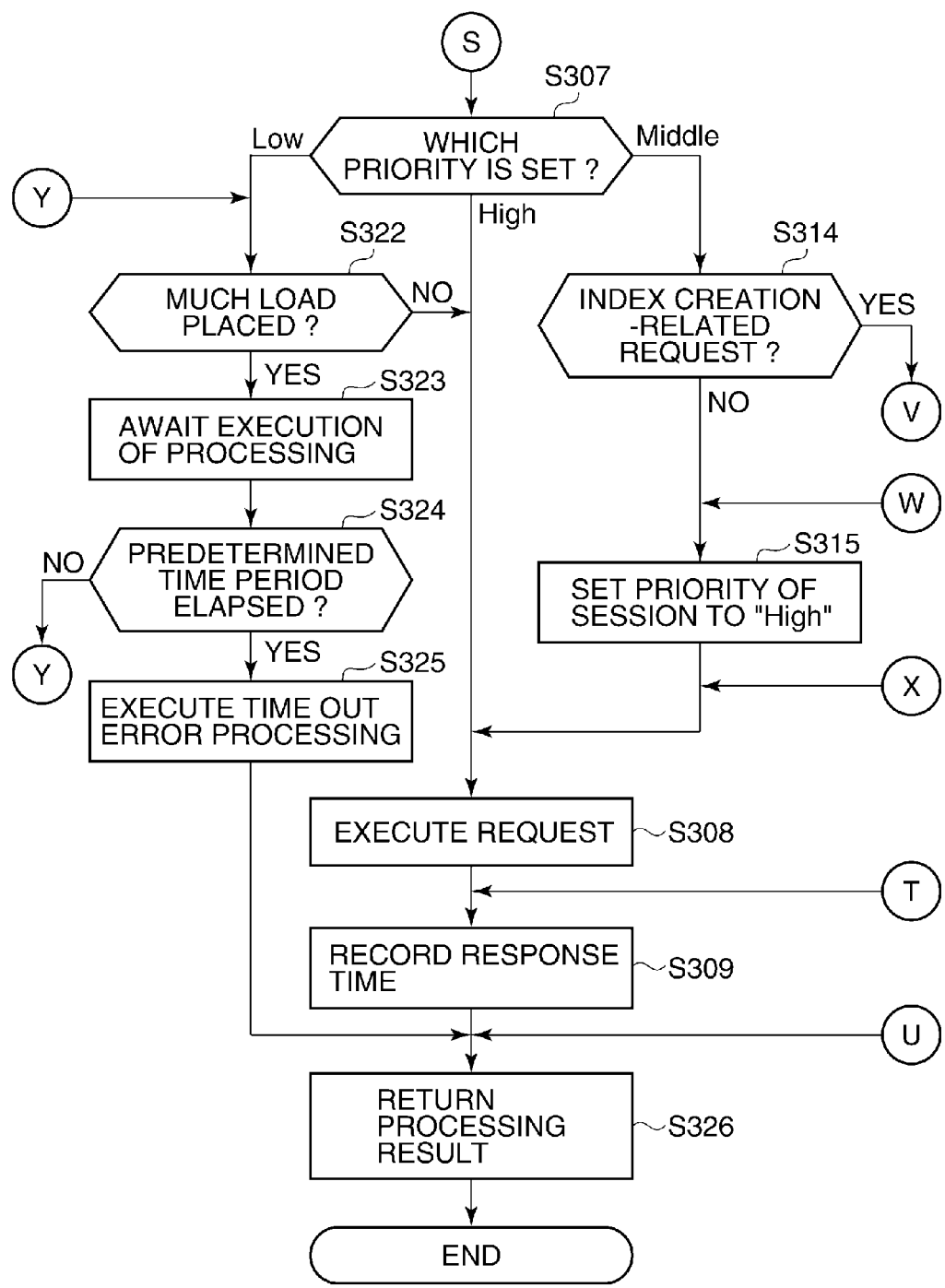
[FIG. 14B] A continuation of FIG. 14A.

Next, a description will be given of a data access process including processing priority setting, which is executed by the data access processing section 200 of the image forming apparatus 402 of the present embodiment, with reference to to FIGS. 14A to 14C. The data access process in FIGS. 14A to 14C is executed by the CPU 101 loading a data access-processing program stored in the HDD 104 or the ROM 103 of the image forming apparatus 402 into the RAM 102. It should be noted that in FIGS. 14A to 14C, the same steps as those of the first embodiment (FIGS. 4A to 4C) are denoted by the same step numbers, and description thereof is omitted.

First, in a step S1301 in FIG. 14A following the step S301 in FIG. 14A, described in FIG. 4A, the CPU 101 determines, by the request receiving & responding section 202, whether or not the request received in the step S301 is a logout request, and if the request is a logout request, the CPU 101 proceeds to a step S1302, whereas if the request is not a logout request, the CPU 101 proceeds to a step S1303.

In the step S1302, the CPU 101 sets, by the session management section 204, "Yes" at the column of logout in the session management table for the session, and then proceeds to the step S309. In the present embodiment, the response time of the logout request is also recorded in the session management table in the step S309, and the CPU 101 proceeds to the step S326 in FIG. 14B.

In the step S1303, the CPU 101 searches, by the session management section 204, the session management table to check whether or not there is any access recorded therein which was made from the same address and user. If there is no such an access recorded therein, the CPU 101 proceeds to a step S1304, whereas if there is any such an access, the CPU 101 proceeds to a step S1309.

In the step S1304, the CPU 101 determines, by the request receiving & responding section 202, whether or not the request received in the step S301 is a login request. Then, if it is determined that the request is not a login request, it means that the access to the data is attempted without login, and hence the CPU 101 proceeds to a step S1305 to cause the session management section 204 to perform error processing, and then proceeds to the step S326. On the other hand, if it is determined that the request is a login request, the CPU 101 proceeds to a step S1306.

In the step S1306, the CPU 101 executes, by the login processing section 203, login processing. This is the same processing as executed in the step S303 in FIG. 4A, and after execution of the login processing, the CPU 101 proceeds to a step S1307.

In the step S1307, the CPU 101 creates the session management section 204 to create a session in the session management table based on the above-mentioned address and user name, and then proceeds to a step S1308.

In the step S1308, the CPU 101 sets, by the session management section 204, each of the variables n and t to an initial value of 0, clears the response time, and sets the entry at the column of logout to "No", and then proceeds to the step S306, which is described hereinabove with reference to FIG. 4A.

On the other hand, in the step S1309, the CPU 101 determines, by the request receiving & responding section 202, whether or not the request received in the step S301 is a login request. Then, if it is determined that the request is a login request, the CPU 101 proceeds to a step S1310, whereas if the request is not a login request, the CPU 101 proceeds to a step S1314.

In the step S1310, the CPU 101 determines, by the session management section 204, whether or not there is "Yes" recorded at the column of logout in the session management table in association with the session of the present address and user. Then, if "Yes" is not recorded in the column of logout, this indicates that login is executed again without the session being logged out, and hence the CPU 101 proceeds to a step S1311 to cause the session management section 204 to execute error processing, and then proceeds to the step S326. On the other hand, if it is determined that Yes is recorded at the column of logout, the CPU 101 proceeds to a step S1312.

In the step S1312, the CPU 101 executes, by the login processing section 203, login processing. This login processing is the same as executed in the step S303 described hereinabove with reference to FIG. 4A, and after the login processing is executed, the CPU 101 proceeds to a step S1313.

In the step S1313, the CPU 101 changes, by the session management section 204, the entry at the column of logout associated with the session of the present address and user to No without creating a new session, and then proceeds to the step S1314.

In the step S1314, the CPU 101 reads out, by the session management section 204, the session information of the present address and user, and then proceeds to the step S307 in FIG. 14B, which is described hereinabove with reference to FIG. 4B.

As described above, in the present embodiment, the access repeated from the same address and user within a predetermined time period for login and logout can be regarded as the access for the same session. Therefore, it is possible to determine whether or not an access has been made by programmed automatic processing from the search server 403 or the like that performs such an access. The other configuration and advantageous effects of the present embodiment are the same as those of the first embodiment.

The present invention is by no means limited to examples of the above-described embodiments, but all such changes, modifications, and variations are possible which do not depart from the spirit and scope of the present invention, Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

200 data access processing section
201 application
202 request receiving & responding section
203 login processing section
204 session management section
205 priority management section
206 logical data access section
207 physical data access section
208 load status management section
209 physical data storing section

The invention claimed is:

1. An information processing apparatus, comprising:
a processor and a memory;
a request receiving unit configured to receive a processing request for execution;
a priority management unit configured to set a priority of said received request;
a processing execution unit configured to execute processing of said request received by said request receiving unit, based on said priority thereof set by said priority management unit;
a responding unit configured to return a response of a result of said processing executed by said processing execution unit to a requesting source of said processing request;
a judgment unit configured to judge whether or not said processing request received by said request receiving unit is a specific request;
a counting unit configured to count a number of times that a time period elapsed after returning said response from said responding unit to said requesting source until receipt of a next processing request by said request receiving unit is within a predetermined time period, when it is judged by said judgment unit that said processing request is a specific request; and
a determination unit configured to determine whether or not to change said priority set by said priority management unit to a low priority, based on said number of times counted by said counting unit.

2. The information processing apparatus according to claim 1, further comprising a load status management unit configured to manage a load status of said information processing apparatus, and wherein when a load on said information processing apparatus which is indicated by said load status managed by said load status management unit is high, said processing execution unit postpones execution of said processing by said priority management unit.

3. The information processing apparatus according to claim 1, wherein when it is judged by said judgment unit that said processing request is not a specific request, said priority management unit sets the priority of said processing to a high priority.

4. The information processing apparatus according to claim 1, wherein said judgment unit judges that said processing request is a specific processing reques twhen a pattern of a combination of processing requests received by said request receiving unit is included in a list of specific patterns of combinations of processing requests.

5. The information processing apparatus according to claim 1, further comprising an adjusting unit configured to adjust said predetermined time period based on a type of an immediately preceding processing request received by said request receiving unit and a size of data returned by said responding unit to the requesting source having requested said immediately preceding request.

6. The information processing apparatus according to claim 1, further comprising a checking unit configured to check a load status of a network, and an adjusting unit configured to adjust said predetermined time period based on a load on said network indicated by said load status of said network checked by said checking unit.

7. The information processing apparatus according to claim 1, further comprising a detecting unit configured to detect that a console section is operated, and a notifying unit configured to notify a load status management unit of a result of said detection when said detecting unit detects that said console section is operated.

8. The information processing apparatus according to claim 1, further comprising a log analyzing unit configured to analyze a usage log and thereby predict a load status, and wherein said load status management unit acquires said load status predicted by said log analyzing unit.

9. An information processing apparatus, comprising:
a processor and a memory;
a request receiving unit configured to receive a processing request for execution;
a priority management unit configured to set a priority of said received request;
a processing execution unit configured to execute processing of said request received by said request receiving unit, based on said priority thereof set by said priority management unit;
a responding unit configured to return a response of a result of said processing executed by said processing execution unit to a requesting source of said processing request;
a judgment unit configured to judge whether or not said processing request received by said request receiving unit is a specific request;
a counting unit configured to count a number of times that a time period elapsed after returning said response from said responding unit to said requesting source until receipt of a next processing request by said request receiving unit exceeds a predetermined time period, when it is judged by said judgment unit that said processing request is a specific request; and
a determination unit configured to determine whether or not to change said priority set by said priority management unit to a high priority, based on said number of times counted by said counting unit.

10. A method of controlling an information processing apparatus, comprising:
receiving a processing request for execution;
setting a priority of said received request;
executing processing of said received processing request, based on said set priority thereof;
returning a response of a result of said executed processing to a requesting source of said processing request;
judging whether or not said received processing request is a specific request;
counting a number of times that a time period elapsed after returning of said response to said requesting source until receipt of a next processing request is within a predetermined time period, when it is judged that said processing request is a specific request; and
determining whether or not to change said set priority to a low priority, based on said counted number of times.

11. A method of controlling an information processing apparatus, comprising:
receiving a processing request for execution;
setting a priority of said received request;
executing processing of said received processing request, based on said set priority thereof;
returning a response of a result of said executed processing to a requesting source of said processing request;
judging whether or not said received processing request is a specific request;
counting a number of times that a time period elapsed after returning of said response to said requesting source until receipt of a next processing request exceeds a predetermined time period, when it is judged that said processing request is a specific request; and
determining whether or not to change said set priority to a high priority, based on said counted number of times.

12. A non-transitory computer-readable storage medium storing a computer-executable program for causing a computer to execute a method of controlling an information processing apparatus, wherein the method comprises:
receiving a processing request for execution;
setting a priority of said received request;
executing processing of said received processing request, based on said set priority thereof;
returning a response of a result of said executed processing to a requesting source of said processing request;
judging whether or not said received processing request is a specific request;
counting a number of times that a time period elapsed after returning of said response to said requesting source until receipt of a next processing request is within a predetermined time period, when it is judged that said processing request is a specific request; and
determining whether or not to change said set priority to a low priority, based on said counted number of times.

13. A non-transitory computer-readable storage medium storing a computer-executable program for causing a computer to execute a method of controlling an information processing apparatus, wherein the method comprises:
receiving a processing request for execution;
setting a priority of said received request;
executing processing of said received processing request, based on said set priority thereof;
returning a response of a result of said executed processing to a requesting source of said processing request;
judging whether or not said received processing request is a specific request;
counting a number of times that a time period elapsed after returning of said response to said requesting source until receipt of a next processing request exceeds a predetermined time period, when it is judged that said processing request is a specific request; and determining whether or not to change said set priority to a high priority, based on said counted number of times.

* * * * *